United States Patent
Pinkston et al.

(10) Patent No.: US 8,751,626 B2
(45) Date of Patent: *Jun. 10, 2014

(54) MODEL-BASED COMPOSITE APPLICATION PLATFORM

(75) Inventors: Jeffrey S Pinkston, King County, WA (US); Bradford H. Lovering, King County, WA (US); Donald F. Box, King County, WA (US); Stevan Swartz, Redmond, WA (US); Destry W. Hood, King County, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/247,829

(22) Filed: Oct. 8, 2008

(65) Prior Publication Data

US 2009/0157872 A1 Jun. 18, 2009

Related U.S. Application Data

(60) Provisional application No. 60/982,032, filed on Oct. 23, 2007.

(51) Int. Cl.
*G06F 15/173* (2006.01)
(52) U.S. Cl.
USPC ........... 709/224; 709/223; 717/101; 717/102; 717/106; 717/115
(58) Field of Classification Search
USPC .................................. 709/224, 251; 719/314
See application file for complete search history.

(56) References Cited

U.S. PATENT DOCUMENTS

| | | | |
|---|---|---|---|
| 6,167,564 A | 12/2000 | Fontana et al. | |
| 6,195,794 B1 | 2/2001 | Buxton | |
| 6,415,384 B1 | 7/2002 | Dave | |
| 7,155,380 B2 | 12/2006 | Hunt | |
| 7,188,158 B1 | 3/2007 | Stanton | |
| 7,200,530 B2 | 4/2007 | Brown | |
| 7,316,000 B2 | 1/2008 | Poole et al. | |
| 7,363,612 B2 | 4/2008 | Satuloori et al. | |
| 7,395,536 B2 * | 7/2008 | Verbeke et al. | 718/100 |
| 7,421,716 B1 | 9/2008 | Margulis et al. | |
| 2001/0039570 A1 | 11/2001 | Stewart et al. | |
| 2002/0035584 A1 | 3/2002 | Scheier et al. | |

(Continued)

FOREIGN PATENT DOCUMENTS

JP 2005166040 6/2005

OTHER PUBLICATIONS www.fiorano.com/docs/Fiorano_SOA_2007_Technical_Value_Prop.ppt "Fiorano SOA 2007 Platform—Technical Features and Benefits"—Jan. 17, 2008, Fiorano.*

(Continued)

*Primary Examiner* — Randy Scott
(74) *Attorney, Agent, or Firm* — Nicholas Chen; Kate Drakos; Micky Minhas

(57) ABSTRACT

Embodiments provide an architecture to enable composite, autonomous composite applications and services to be built and deployed. In addition, an infrastructure is provided to enable communication between and amongst distributed applications and services. In one or more embodiments, an example architecture includes or otherwise leverages five logical modules including connectivity services, process services, identity services, lifecycle services and tools.

20 Claims, 17 Drawing Sheets

(56) References Cited

U.S. PATENT DOCUMENTS

| | | |
|---|---|---|
| 2002/0078003 A1 | 6/2002 | Krysiak et al. |
| 2002/0104067 A1 | 8/2002 | Green et al. |
| 2002/0116454 A1* | 8/2002 | Dyla et al. .................... 709/203 |
| 2002/0156814 A1 | 10/2002 | Ho |
| 2002/0184402 A1 | 12/2002 | Gangopadhyay |
| 2003/0074482 A1 | 4/2003 | Christensen et al. |
| 2003/0079047 A1 | 4/2003 | Fitts et al. |
| 2003/0120651 A1 | 6/2003 | Bernstein et al. |
| 2004/0049565 A1* | 3/2004 | Keller et al. .................. 709/223 |
| 2004/0119752 A1 | 6/2004 | Beringer et al. |
| 2004/0162741 A1 | 8/2004 | Flaxer et al. |
| 2004/0181425 A1 | 9/2004 | Schwerin-Wenzel et al. |
| 2004/0181775 A1 | 9/2004 | Anonsen |
| 2004/0187140 A1 | 9/2004 | Aigner et al. |
| 2004/0205691 A1 | 10/2004 | Poole et al. |
| 2004/0230447 A1 | 11/2004 | Schwerin-Wenzel et al. |
| 2005/0010893 A1* | 1/2005 | Schmidt et al. ............... 717/103 |
| 2005/0091259 A1 | 4/2005 | Parthasarathy |
| 2005/0144226 A1 | 6/2005 | Purewal |
| 2005/0204354 A1 | 9/2005 | Sundararajan et al. |
| 2005/0256882 A1 | 11/2005 | Able et al. |
| 2005/0257192 A1 | 11/2005 | Chelle et al. |
| 2005/0267947 A1 | 12/2005 | Patrick et al. |
| 2006/0015584 A1* | 1/2006 | Ocko et al. .................... 709/219 |
| 2006/0031845 A1 | 2/2006 | Ackerman et al. |
| 2006/0034237 A1 | 2/2006 | Patrick et al. |
| 2006/0053144 A1 | 3/2006 | Hite et al. |
| 2006/0129512 A1 | 6/2006 | Braun et al. |
| 2006/0129546 A1* | 6/2006 | Braun et al. ..................... 707/4 |
| 2006/0130063 A1 | 6/2006 | Kilian et al. |
| 2006/0206890 A1 | 9/2006 | Shenfield |
| 2006/0212593 A1 | 9/2006 | Patrick et al. |
| 2006/0271933 A1 | 11/2006 | Agassi et al. |
| 2007/0011126 A1 | 1/2007 | Conner et al. |
| 2007/0011334 A1 | 1/2007 | Higgins et al. |
| 2007/0033088 A1 | 2/2007 | Aigner |
| 2007/0033571 A1 | 2/2007 | Moore et al. |
| 2007/0086476 A1 | 4/2007 | Iglesias |
| 2007/0118844 A1 | 5/2007 | Huang et al. |
| 2007/0135936 A1 | 6/2007 | Dumas et al. |
| 2007/0150075 A1 | 6/2007 | Dumas et al. |
| 2007/0174815 A1 | 7/2007 | Chrysanthakopoulos |
| 2007/0282746 A1 | 12/2007 | Anke et al. |
| 2007/0294364 A1 | 12/2007 | Mohindra et al. |
| 2007/0294668 A1 | 12/2007 | Mohindra et al. |
| 2008/0313090 A1 | 12/2008 | Portman et al. |
| 2009/0125879 A1 | 5/2009 | Miloushev |
| 2009/0165021 A1 | 6/2009 | Pinkston |

OTHER PUBLICATIONS

Next-Generation soA Infrastructure—Oracle, May 2007 http://www.oracle.com/technetwork/topics/next-generation-soa-infrastructure-132959.pdf.*

"Fiorano SOA 2007 Platform—Technical Features and Benefits", Retrieved from http://fiorano.best.vwh.net/products/fesb/fesb_features.htm on Jan. 17, 2008., 2 Pages.

"Next-Generation SOA Infrastructure", http://www.oracle.com/technology/tech/standards/pdf/next-generation-soa-infrastructure.pdf, (May 2007),7 Pages.

"A Platform Architecture to Support the Deployment of Distributed Applications", Retrieved from http://ieeexplore.ieee.org/iel5/7828/21517/00997311.pdf. (2002),5 pages.

"A Generic Deployment Framework for Grid Computing and Distributed Applications", Retrieved from http://arxiv.org/ftp/arxiv/papers/0706/0706.3008.pdf., 10 pages.

"Sun Java Composite Application Platform Suite (Java CAPS)" Retrieved from http://www.sun.com/software/javaenterprisesystem/javacaps/index.jsp on Jan. 17, 2008. 2 pages.

"PCT Search Report and Written Opinion", Application No. PCT/US2008/080823, (Mar. 25, 2009),11 pages.

"PCT Search Report and Written Opinion" Application No. PCT/US2008/080821, (Apr. 28, 2009),10 pages.

"Final Office Action", U.S. Appl. No. 12/247,793, (Jul. 20, 2012),56 pages.

"Foreign Office Action", Chinese Application No. 200880113463.1, (Jun. 1, 2012),6 pages.

"Extended European Search Report", European Patent Application No. 08841420.6, (Aug. 31, 2011),5 pages.

"Foreign Office Action", Chinese Application 200880113463.1, (Oct. 26, 2011),6 pages.

Hofmeister, Helge et al., "A Multi-Layered Framework for Pattern-Aided Composite Application Design", In Proceedings of WMSCI 2007,(Jul. 11, 2007),6 pages.

"Non-Final Office Action", U.S. Appl. No. 12/247,793, (Feb. 17, 2012),63 pages.

"Foreign Office Action", Russian Application No. 2010116037, (Nov. 13, 2012), 10 pages.

"Foreign Office Action", Japanese Application No. 2010-531209, (Dec. 28, 2012), 4 pages.

"Foreign Notice of Allowance", Japanese Application No. 2010-531209, (Apr. 19, 2013), 6 pages.

"Non-Final Office Action", U.S. Appl. No. 12/247,793, (May 28, 2013), 62 pages.

"Final Office Action", U.S. Appl. No. 12/247,793, Dec. 16, 2013, 71 pages.

* cited by examiner

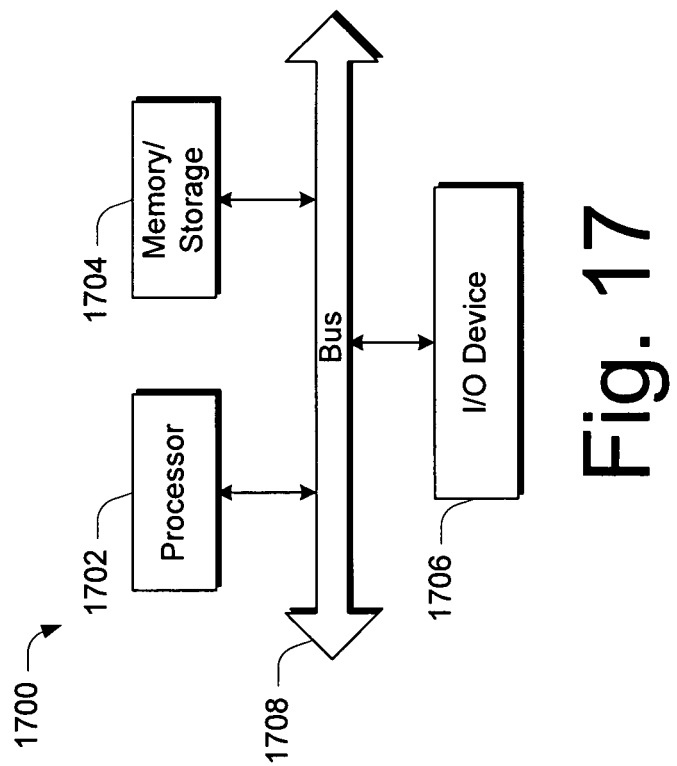

MODEL-BASED COMPOSITE APPLICATION PLATFORM

RELATED APPLICATIONS

This application stems from and claims priority to U.S. Provisional Application Ser. No. 60/982,032, filed on Oct. 23, 2007, the disclosure of which is incorporated by reference herein.

BACKGROUND

Developing and deploying data-driven, composite applications—that is, applications that are built by combining multiple modules—can be a challenging task, particularly when one considers deployment in a distributed environment.

To date, the need for specific low level programming knowledge has presented formidable barriers to the development and deployment of data-driven, composite applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide an architecture to enable autonomous composite applications and services to be built and deployed. In addition, an infrastructure is provided to enable communication between and amongst distributed applications and services.

In one or more embodiments, an example architecture includes or otherwise leverages five logical modules including connectivity services, process services, identity services, lifecycle services and tools.

BRIEF DESCRIPTION OF THE DRAWINGS

The same numbers are used throughout the drawings to reference like features.

FIG. 17 illustrates an example system that can be utilized to implement one or more embodiments.

DETAILED DESCRIPTION

Overview

Figure 1:
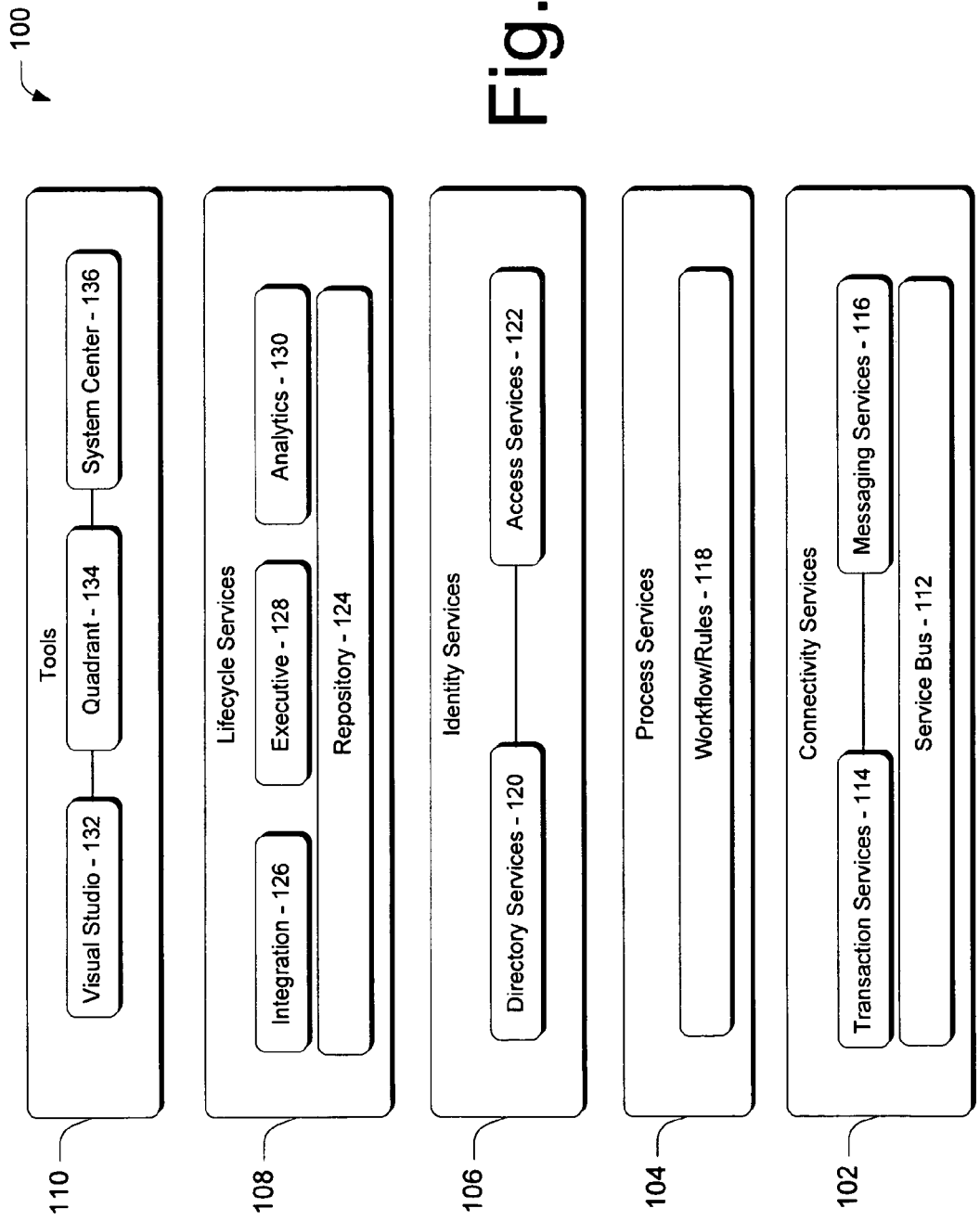
FIG. 1 illustrates an example high level view of an architecture or platform in accordance with one or more embodiments.

As noted above, applications that are built by combining multiple modules are referred to as "composite applications". The different parts of a composite application (e.g., the client part, business process part, data store part and the like) can run in completely different environments (e.g., ASP.NET, BizTalk, SQL Server), which greatly increases the difficulty of dealing with the application as a whole. In addition, the different moments in the composite application lifecycle are often poorly automated if at all. To date, composite application infrastructure currently lags its requirements, e.g. it is not at all unusual for rich composite application authors to report that they spend more than 90% of their resources writing infrastructure code. As distributed processing and bandwidth becomes more and more ubiquitous, businesses and others face a tantalizing gap between what they conceive and what they can afford to build, deploy and manage.

Development of a model of a composite application should make it possible for non-traditional programming communities to participate in building significant applications. This is made possible by enabling people to work on applications without necessarily writing scripts or code. Functional abstractions such as rules or workflows (described below) are somewhat closer to the way people actually think about systems than code and installation scripts.

In the discussion that follows, the notion of a platform or architecture is introduced. The platform can provide a unified target for declarative programming experiences and domain specific languages. Declarative experiences can be provided across the lifecycle of an application such that programming end users can deal with their particular systems in terms of declarative abstractions, and not in terms of code or scripts. As will be described below, a common repository shared by applications, tools, and services is utilized and simplifies development and management by reducing the number of different stores involved in the application lifecycle. The greater value of the repository is that it contains schemas and content in the form of models. Ongoing use of the repository can teach application writers to think in terms of models. As more aspects of applications appear as content in the repository, new synergies between parts will become apparent and exploitable in ways never before possible.

Today, managing and analyzing a composite application involves completely different experiences for each part of the application. In accordance with the embodiments described below, composite applications can be managed and analyzed as a whole, rather than as different parts. In at least some embodiments, it is possible to deploy, manage, and analyze applications as entire entities through a single interface. Additionally, individual parts of those applications can be incrementally versioned using the described platform. In one or more embodiments, observation models can be established from the point of view of the entire application, which leads to an understanding of the execution of the composite application through its various parts in terms of unified, analyst-friendly metaphors.

In the embodiments described below, an architecture is described and enables autonomous composite applications and services to be built, deployed and managed. The architecture can enable different types of composite applications to be described in terms of models. Composite applications are applications that are driven by data change events. Composite applications are typically specified in terms of rules that specify exactly what sort of data changes are interesting, and actions that are triggered when the data changes. For example, message-driven composite applications are applications that are driven by the exchange of messages. This group breaks down into n-tier (request-response) composite applications, queued composite applications, and pub-sub or event-driven composite applications. Scheduled composite applications are applications that are driven by a scheduler. The scheduler is programmed by a model describing control flow through modules. A workflow application is a good example of this type of application. For each of these types of applications, there is a corresponding communication infrastructure or rather, a corresponding usage pattern of the communication infrastructure.

In addition, an infrastructure is provided to enable communication between and amongst distributed applications and services. The architecture, also referred to as a "platform", provides a mechanism that enables developers to build rich autonomous composite applications and services. A composite application is described by data in the form of a model, which is then used to build and deploy application components in a distributed manner. The described platform or architecture can be used to manage a set of machines or computing devices and a set of applications that run on them.

In one or more embodiments, an example architecture includes or otherwise leverages five logical modules including connectivity services, process services, identity services, lifecycle services and tools, although the functionality embodied by the modules need not necessarily be represented by this particular architecture. Rather, other architectures can be utilized without departing from the spirit and scope of the claimed subject matter.

In the discussion that follows, a section entitled "Composite Applications" is provided and discusses the notion of a composite application and what is meant by a "composite application". Following this, a section entitled "Example Architecture or Platform" is provided and describes, in accordance with one or more embodiments, one example architecture or platform that can be utilized to enable development and deployment of composite applications. Within this section, several sub-sections will be provided to describe various aspects of the architecture. Lastly, a section entitled "Example System" is provided and describes an example computing device that can be utilized to implement one or more aspects of the described embodiments.

Composite Applications

As noted above, a composite application is an application that is described by a model. The model can then be used to select an application's constituent parts, build an instance of a corresponding application and deploy the application instance in an appropriate environment. Hence, one goal of the platform is to be able to describe composite applications with models, and then design, develop, deploy and manage those applications on the platform.

Specifically, in at least some embodiments, the structure of an entire connected application is described in terms of a distributed model. This model can assume one or more of several types of models such as, by way of example and not limitation, a message-driven model, a data-driven model, a scheduled (or workflow) model, and the like. Individual components of an application at one level of granularity can be an entire connected application at the next level of granularity. As one becomes more specific, the types of models used to describe parts of the application may change rather dramatically. So, for instance, at one level one might have a message- or call-driven application consisting of a web page, some business logic, and a database. This application would then be described by one type of model. Looking specifically at the business logic aspect of the application, one might find it to be described by a second type of model made up of rules and declarative workflows. By expressing applications, in at least some embodiments, in terms of rules and declarative work flows, a higher level of abstraction is provided for the developer so that the developer does not have to necessarily understand low level programming details. Hence, flexibility is enhanced by opening up the development process to those who do not necessarily have knowledge of low level programming languages.

In some embodiments, an application shell (or some other tool such as those described below) in the form of a user interface is provided and allows the developer to develop an application. Through the application shell, the developer can provide a declarative description of his or her application and can define such things as commands, documents, visualizations, jobs or tasks, communication contracts, identity and more. Thus, the shell can provide a mechanism by which a developer can develop and plug in their application. The application shell then has the mechanisms to use lower levels of the architecture at execution time. These lower level mechanisms can be transparent to the developer.

Having discussed the general notion of a composite application, consider now a discussion of an example architecture or platform that can enable such applications to be developed and deployed.

Example Architecture or Platform

In the discussion that follows, an example architecture or platform is described. It is to be appreciated and understood that the described architecture or platform constitutes but one way of describing the functionality described herein. Accordingly, other architectures or platforms can be utilized without departing from the spirit and scope of the claimed subject matter.

FIG. 1 illustrates an example high level view of an architecture or platform in accordance with one or more embodiments, generally at 100. Architecture 100 includes, in this example, five logical components—a connectivity services component 102, a process services component 104, an identity services component 106, a lifecycle services component 108 and a tools component 110. These individual architecture components have their own sub-components, each of which is described under a corresponding subsection below.

Briefly though, the connectivity services component 102 includes, in this example, a service bus component 112, a transaction services component 114 and a messaging services component 116. Process services component 104 includes a workflow/rules component 118. Identity services component 106 includes a directory services component 120 and an access services component 122. Lifecycle services component 108 includes a repository component 124, an integration component 126, an executive component 128 and an analytics component 130. Tools component 110 includes a code-based component (such as Visual Studio) 132, a model-based tool (such as Quadrant) 134 and an enterprise management tool (such as a system center component) 136.

Collectively, architecture 100 and its constituent parts enable composite applications to be developed and deployed as will become apparent below.

Connectivity Services Component

In one or more embodiments, connectivity services component 102 includes, in this example, a service bus component 112, a transaction services component 114 and a messaging services component 116.

Service Bus Component

In one or more embodiments, service bus component 112 (or more simply, the "service bus") provides an infrastructure that allows applications and services to communicate with one another. To this extent, the service bus can be thought of as the connective fabric between services and applications.

From a functional standpoint, the service bus is utilized to virtualize transfer, discovery and synchronization between diverse "endpoints". Notably, in at least some embodiments, the service bus also offers transformation, filtering, assembly and disassembly, and protocol/transport bridging at endpoints.

Endpoints, examples of which are provided below, can include applications that are built on or utilize the described architecture. The service bus builds on a layered data model, provides name-based and predicate-based lookup and discovery functionality, and so-called claims-based security described below. Endpoint characteristics (i.e. characteristics of the location at which listening takes place) are modeled, in this example, through a layered and extensible metadata stack. The service bus utilizes or otherwise can provide various pluggable entities to accomplish its tasks. For example, pluggable transports can be utilized to virtualize message transfer, independent of endpoint semantics. Pluggable encoders can be utilized to virtualize message representation independent of local data models. Further, pluggable adapters are used to bridge the metadata and messages from a set of endpoints onto the bus.

In practice, applications utilize the service bus to communicate with services or other applications. With respect to services and applications, consider the following analogy. Services are components of composite applications in the same way that objects are components of local applications. When one is writing an object-oriented application, the entire application is an object and then one just writes that object in terms of other objects. Just so, when one is writing a service-oriented application, the application might be a service, and then one would write those services in terms of other services. Eventually the services have a local implementation, and they are written with objects. Prior to communicating with another application or service, the application can, in some embodiments, search and find the particular entity with which communication is desired. To this end, the service bus provides search and discovery components that enable the discovery of the applications or services (via, for example a network address) with which the application desires to communicate. Alternately or additionally, a communication pattern can be modeled and the entity with which communication is desired can be identified in a particular model. In addition, the service bus includes synchronization functionality that functions to ensure that data between entities that communicate over the service bus is synchronized. That is, the service bus can provide, in some embodiments, both a message-based communication pattern and a data-based communication pattern. The message-based communication pattern might, for example, specify that A sends messages to B, or A multicasts messages to B1, B2, B3, B4, and so on. The data-based communication pattern may, on the other hand, specify that if A changes data, all parties interested in changes to that data are triggered. Then, any interested party can read or modify the data at any time. The protocols used to communicate this information or data are configurable and extensible.

In one or more embodiments, the service bus can further include a federated naming component that ensures that applications, resources and the like are named consistently. A messaging adapter and framework deals with the notion that data that comes from different sources may be the same logical piece of information. However, the data may need to be transformed so that others on the service bus can recognize it. Hence, the messaging adapter and framework deals with data transformation to ensure cross-platform data consistency and compatibility. For example, in at least some embodiments, applications can create a set of names that are used by that application. Names are then associated with metadata and applications can search for names by queries on the metadata. Applications can send messages directly to names and namespaces can be secured by claims-based mechanisms. The service bus abstracts the notion of senders and receivers. Receivers can thus act on data without concern for where the data emanates. In a multicast version of the service bus, senders can send to a name and receivers can listen on a name. Thus, in at least some embodiments, the sender cannot tell whether "0" or "N" people were listening, and the receiver cannot tell who sent a particular message.

Further, in at least some embodiment, the service bus endpoints can support a variety of features that are utilized to transform messages from sender formats into a format expected by the application at the endpoint. These features can include, by way of example and not limitation, raw transformation, filtering, aggregation and disaggregation (often called "batching", e.g., pulling many messages from a single message, or building many messages into a single message), and protocol bridging (causing a message arriving at an endpoint to be resent on a different instance of the service bus).

The service bus also includes messaging and channel security functionality that pertain to securing communications between the different entities that utilize the service bus. For example, both message exchange and access to service bus resources (e.g., configuration, namespaces) can be secured. Security on features can include, by way of example and not limitation, authentication (that is, are they who they say they are?) and authorization (that is, are they allowed to do what they are asking to do?). Additionally, security functionality can also provide for encryption and other digital rights management (DRM) on individual messages and/or message parts.

Figure 2:
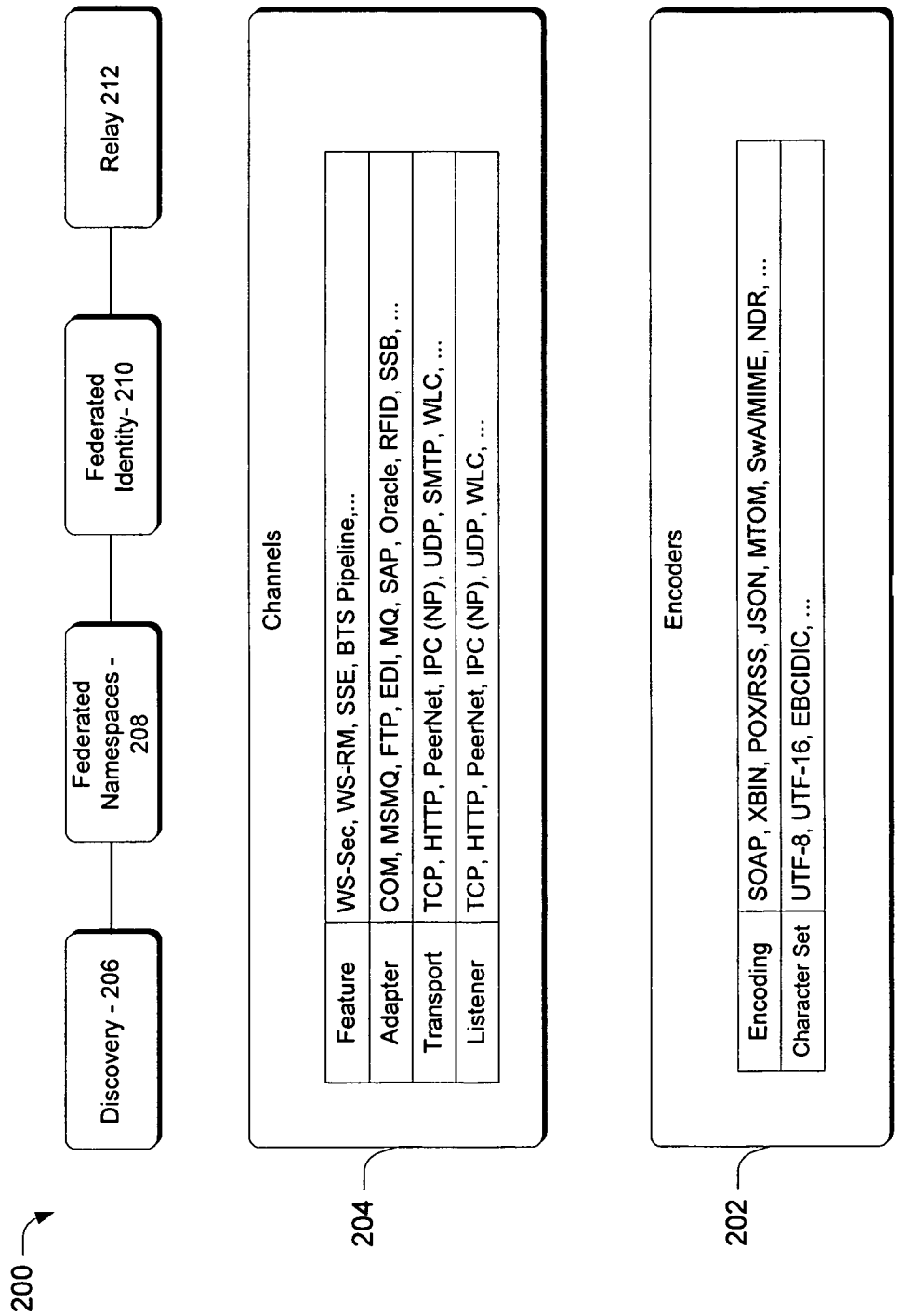
FIG. 2 illustrates aspects of an example service bus in accordance with one or more embodiments.

As but one example of a service bus in accordance with one or more embodiments, consider FIG. 2. There, an example service bus component is shown generally at 200. In this example, service bus component 200 includes an encoder layer 202, a channel layer 204 and various other higher level components that provide functionality described above and below. Specifically, in this example, service bus component 200 includes a discovery component 206, a federated namespaces component 208, a federated identity component 210 and a relay component 212. When a relay component is integrated into the service bus, it is then possible for service bus participants to communicate between endpoints that are separated by firewalls or are otherwise mutually unaddressable. The relay functionality can be implemented using a combination of advanced networking features and intermediaries visible to both endpoints to achieve this purpose, as will be appreciated by the skilled artisan.

In this example, the encoder and channel layers 202, 204 provide functionality that enables point-to-point communication. To this extent, encoder layer 202 supports a number of different encoding standards, e.g. SOAP, XBIN, POX/RSS and the like, as well as character sets. The channel layer 204 comprises different components that facilitate point-to-point communication. By way of example and not limitation, these components include listener components, transport components, adapter components, and feature components.

In one or more embodiments, listener components are responsible for monitoring communication systems and firing events when messages are available on the system. Listener components are used to trigger things such as activation in host systems.

Transport components serve to move messages between one endpoint and another. By definition, transport components use raw transport systems such as TCP or HTTP. Transport components can be linked directly with corresponding listener components. For example, a listener component may fire a "connection available" event and the application may then create a transport channel for that event. The application can then read the new messages on the connection whose existence was signaled by the listener component.

Adapter components can appear like transport components to their users. Adapter components wrap sources or sinks of messages and make them seem like transport components. In at least some embodiments, there can be different types of adapter components. For example, line of business (LOB) adapter components wrap a line of business system such as SAP or Peoplesoft. Messaging adapter components wrap messaging infrastructure or intermediaries like DCOM, MSMQ, MQ, or TibCo.

Feature components are components that implement features at the endpoint that are not encoders or transports. These include protocol components like WS-Security or WS-RM, transformation and filtering components like those found in BizTalk pipelines, and protocol bridging components.

In one or more embodiments, individual adapters can be written as transport channels so that the same software architecture that receives or gets messages can also be used to connect applications to other applications, messaging infrastructures and the like, as will be appreciated by the skilled artisan.

Collectively, the encoder and channel layers 202, 204 can be considered as a message bus which sends, receives and processes data in the form of messages that are sent by or received into the platform. The message bus can process messages, perform transformations on the messages in various forms, e.g. in an infoset or binary representation, and/or otherwise make the message content available for other components of the platform.

In addition to message processing and serving as a lower level, point-to-point transport service, service bus component 200 also includes higher level components such as the illustrated discovery component 206, federated namespaces component 208, federated identity component 210 and relay component 212.

In the illustrated and described embodiment, discovery component 206 includes functionality that enables individual queries into the service bus and returns results that match the individual queries. For example, an application may issue a query to find a printer, find a service that handles purchase orders and the like. The discovery component enables such queries and associated results to be returned to querying parties. Thus, discovery component 206 supports indirection between modules in a connected application. For example, in the previous discussion, the notion of naming was discussed.

In at least some embodiments, two kinds of names are germane to consider here. First, endpoints can have names. Thus, the service bus can be presented with a name with which communication is desired. Entities who wish to communicate with other entities use an associated name rather than a particular address. Second, the service bus infrastructure has names inside of itself, e.g., names of resources that outlive any particular endpoint. Those names can be, by way of example and not limitation, names of queues (which are names with a single reader as well as a single writer), and/or they can be names of topics (which are names with multiple readers and/or multiple writers). These names can be associated with "metadata", meaning structured data describing the thing being named. Discovery, as implemented by the discovery component, pertains to the business of finding names in the service bus, either directly by name (if known) or indirectly by means of querying the metadata (e.g., if you know you need whomever "processes purchase orders").

Figure 3:
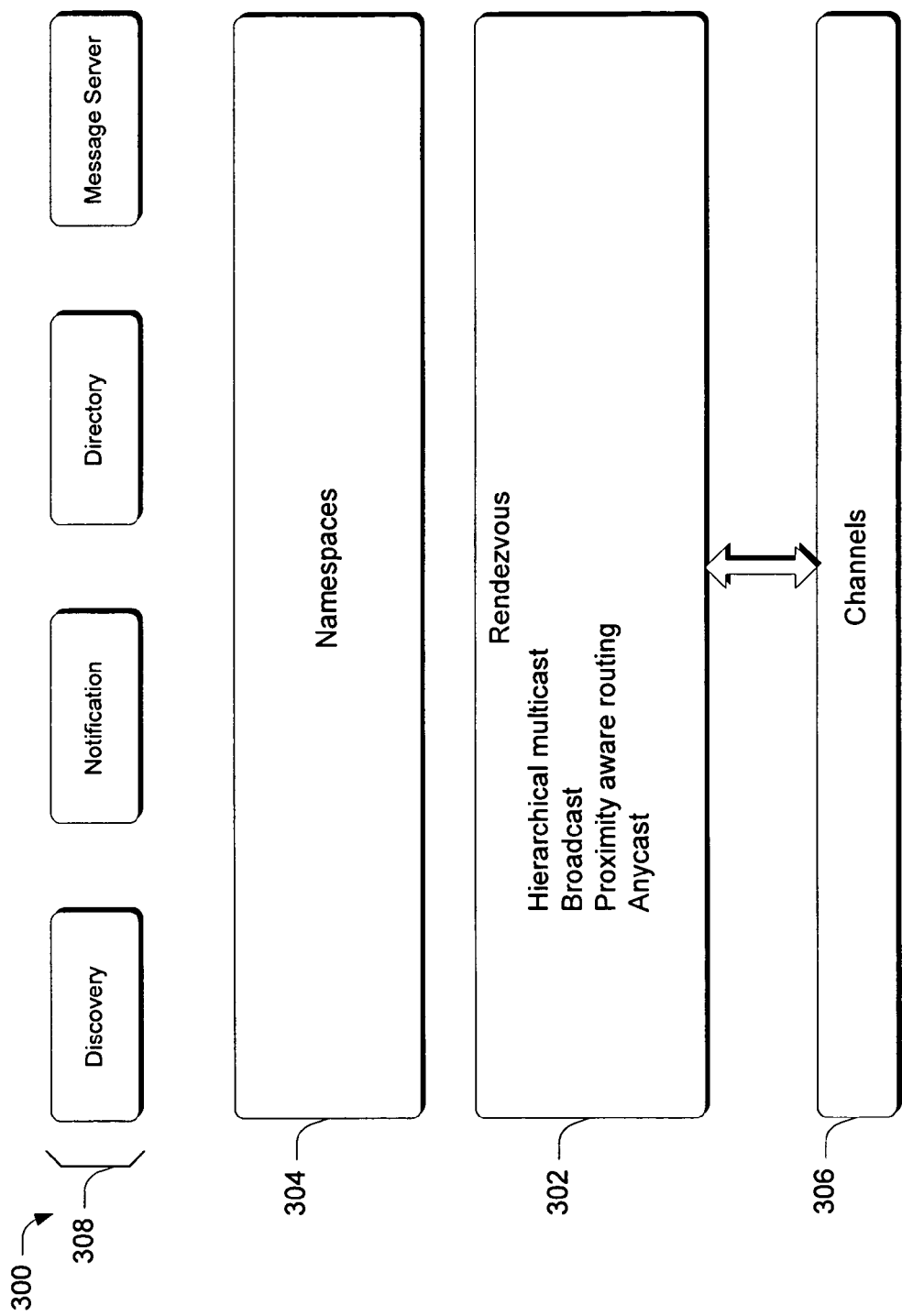
FIG. 3 illustrates an environment in which a federated namespaces component can operate in accordance with one or more embodiments.

This can be implemented by the messaging infrastructure in cases dealing with adapters that wrap an infrastructure that has its own decorated names. It can also be implemented by a discovery server in cases where a service using a lightweight transport (HTTP) wishes to register names with the service bus. FIG. 3 illustrates, generally at 300, an environment in which the federated namespaces component can operate in accordance with one or more embodiments. Here, the federated namespaces component includes two layers—a rendezvous layer 302 and a namespaces layer 304. These layers are shown logically interposed between a channel layer 306 (which corresponds to the channel layer 204 of the message bus of FIG. 2 and which is used for point-to-point communication) and a number of features that can be built on top of the namespace layer 304. These additional features are logically represented at 308 and include, by way of example and not limitation, discovery services, notification services, directory services and message server services. All of these services can utilize the namespace layer 304 to, in essence, "plug in" to the platform and use the namespace functionality to provide a rich suite of functionality.

In the illustrated and described embodiment, the rendezvous layer 302 implements wide-area proximity-aware routing. In the illustrated and described embodiment, the rendezvous layer 302 provides federated address spaces. Machines or devices can join a particular address space regardless of whether the machines or devices are actually "visible" to the other machines or devices in the address space. For example, machines or devices might be separated by firewalls, might be located in corporate subnets that are not publicly addressable, and the like. Machines or devices can send to particular machines or devices on the federated address space by address, and they can multicast to all the machines or devices in the address space. So, in some instances, features of a TCP subnet are provided, except that they can be set up and taken down dynamically, and do not have to be co-located.

The namespace layer 304 is located logically on top of the rendezvous layer 302 and provides support for names for particular addresses or groups of addresses in the federated address space. Multiple services can listen at the same name and names can be associated with metadata. Names can be searched for based on their metadata. The names give the user a level of indirection when using the federated address space. Names can be created and destroyed dynamically and on a per-application basis.

Additional features shown generally at 308 constitute either uses of this infrastructure or services that are built on top of it. For example, "Discovery" can sometimes refer to the ability to examine the names on top of the address space in order to find names associated with certain sorts of metadata. "Discovery" can also refer to a service on top of this infrastructure that keeps track of metadata/address associations and offers that information through standard discovery protocols, such as UDDI, WS-Discovery, and the like. "Notification" refers to the ability to register a service at names to which notifications are sent. "Directory" refers to an application that provides management services of a set of repositories (e.g., access control, replication control, and the like). "Message Server" refers to services that live in/on the component that provide reliability and/or durability to users of the component.

In one or more embodiments, federated identity component 210 (FIG. 2) provides a security architecture and paradigm for the platform. As one example of a security architecture, consider FIG. 4. There, an example security architecture or system is shown generally at 400. Here, system 400 includes one or more server technology service components 402 which manage tokens, a policy manager 404, a cardspace system 406, a cardspace agent 408, security token managers 410, 418, a client 412, a service 414 and a service authorizing manager 416.

In operation and in accordance with one or more embodiments, security architecture 400 works in the following way. In a messaging stack, when client 412 wishes to use service 414, client 412 does so by utilizing a claim, such as a key. A claim can be considered, at a basic level, as data that constitutes an assertion of some fact. The integrity and secrecy of claims is protected by means of security techniques. Accordingly, in this example, client 412 communicates with the security token manager 410 to ascertain whether there is a claim or key associated with service 414 that it can use to utilize service 414. Policy associated with service 414 identifies claims that are required to access service 414 or, the security protocols can be used to ask service 414 what claims are needed. Client 412 passes the claims it has and information about the claims it needs to its security token manager 410. The security token manager consults with various claims policy stores (such as cardspace system 406 and/or policy manager 404) in order to ascertain which claims it can provide to client 412 to use in its communication. At this point, client 412 communicates with service 414 which takes the claims provided by client 412. Service 414 undergoes a similar claims-resolution process with the service authorization manager 416. Once again, the set of claims provided by the client 412 can be augmented on the server side with claims associated with the client's claims in the server's policy store. Eventually this process completes and the final client claim set is calculated. If the claim set includes the claim needed to communicate with service 414, access is granted.

In at least some embodiments, another level of recursion can take place in which service 414 can point at an intermediary claims server that the client can use to get a claim. The intermediary claims server can redirect to a further claims server and so on. Eventually the recursion stops when there are no more steps to be taken or the required claims are acquired.

Thus, in one way, the mechanism on the service side is the same as the mechanism on the client side. That is, the service 414 starts with claims, presents them to a policy store (e.g. policy manager 404), and has the claims augmented. The policy store can redirect to another policy store, and so on.

Transaction Services Component

Transaction services component 114 (FIG. 1) supports the coordination of the responses of modules in distributed applications to both expected and unexpected states in one or more of the modules. One basic pattern that can be encountered is as follows. A set of resource managers decide to coordinate through a transaction. Those resource managers send their state to a transaction manager who aggregates the states into a transaction outcome, and that outcome is sent back to the resource managers. In the context of longer-running, stateful business processes or service oriented applications, the pattern can be generalized as follows. Information from the distributed application model can be used to identify the set of resource managers involved in a transaction. Stateful application modules need to behave as logical resource managers. The protocol between resource managers and transactions needs to be rich and application-specific, and the aggregation of local states into transaction state needs to be general and policy-driven.

Figure 5:
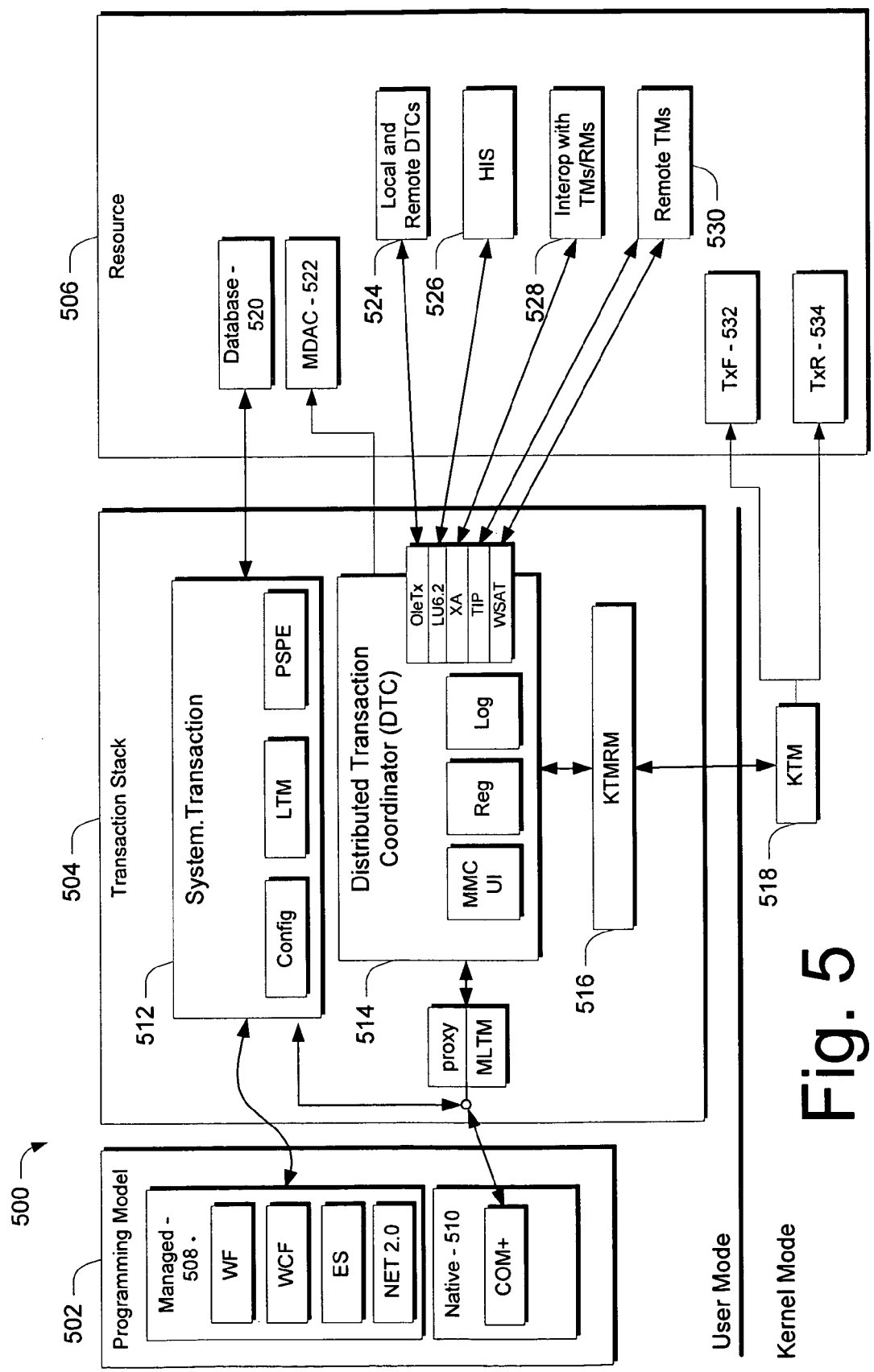
FIG. 5 illustrates an example transaction services environment in accordance with one or more embodiments.

As but one example of a transaction services process, consider the following in connection with FIG. 5. There, a transaction services environment is shown generally at 500. In this example, environment 500 includes a programming model 502, a transaction stack 504 and a resource 506. Each of these, in turn, have individual constituent parts or processes.

Specifically, programming model can include both managed code 508 and native code 510. Transaction stack 504 can include a systems transaction API 512, a distributed transaction coordinator (DTC) 514 and a KTMRM component 516 which communicates with a kernel mode KTM component 518 as shown. Resource 506 can include a number of different types of resources such as database resources 520, MDAC resources 522, local and remote distributed transaction coordinators 524, HIS resources 526, Interop with TMs/RMs 528, remote TMs 530, TxF 532 and TxR 534.

In operation, when programming model 502 wishes to coordinate with other software, it utilizes systems transaction API 512, which is a local API or framework that can be used to interact with the system. In this case, API 512 serves as a front end for the distributed transaction coordinator 514. So, for example, programming model 502 uses this API to establish a domain for coordination of errors. API 512 returns the name of the coordination domain, which is then passed around to other entities with which programming model 502 communicates. These other entities then communicate with distributed transaction coordinator 514 as shown, and indicate that they are doing work within this particular domain. The distributed transaction coordinator 514 can then communicate with other resources such as database resource 520 and the like, to coordinate errors.

In the illustrated and described embodiment, DTC 514 coordinates transactions by, for example, creating transactions, keeping track of all the resources that are part of a transaction, handling voting on transactions, and notififying resources of the results of voting. Transactions have "transaction IDs" created by the DTC 514. The transaction IDs uniquely identify both the individual transaction and the transaction coordinator that created it.

In the illustrated embodiment, five different examples of interaction patterns with various transaction managers or coordinators are shown. In this example, KTM 518 is the transaction manager for kernel code and is used primarily in connection with files and the registry. KTM 518 can coordinate with DTC 514 and through DTC 514 with other remote transaction managers (i.e. local and remote DTCs 524, HIS 526, Interop with TMs/RMs 528, and remote TMs 530). KTM 518 can allow changes to files and registry settings. The illustrated example shows both the mechanism used to communicate with other transaction coordinators (i.e. Ole TX, LU6.2, etc), and the type of transaction coordinator with which communication takes place. Transaction coordinators use a kind of master-slave strategy, with the creator being the master and the other coordinators being the slaves.

Database 520 and MDAC 522 are examples of resources whose state changes are being coordinated by DTC 514. The other remote transaction coordinators deal with other resource managers. When resource managers are asked to change state "in" a transaction, they have to make sure they present the view of that state as if the change was made to everyone who brings along the same transaction. Additionally, they lock access to the state to any other entities. By doing this and then following through the change to the state, good state conditions are maintained.

As an example of the life of a transaction, consider the following. First, a transaction is created and the creator passes the transaction to all resource managers involved. Each resource manager either fulfills the transaction promises or goes into a bad state. At the end, the code that creates the transaction announces that the transaction is finished. The resource managers may then make their changes at once. If, for some reason, a resource manager chooses not to make their state changes, there is a failure and no changes are made.

The programming models 502 abstract this process from the programmer. The programming models handle negotiations with the transaction manager around transaction lifetime (creation and completion) and make transactions available to resources managers. Programming models also know when a transaction is over. If no local errors have occurred, they send an appropriate vote back to the transaction manager.

Messaging Services Component

In one or more embodiments, the messaging services component 116 (FIG. 1) provides a higher-level message brokering service such as durability and standing queries. The messaging services component can be implemented as a hosted service that can operate in standalone mode, in a "clustered" mode where several services communicate directly, or in a "distributed" mode where services can run on clients, on enterprise servers, and/or on servers hosted by a network, such as the Internet. In one or more embodiments, the messaging services component implements common messaging patterns such as queuing and publication/subscription (also referred to as "pub/sub"), and richer features like content-based routing and event correlation. In the illustrated and described embodiment, messaging services are accessed through the message bus's channel abstraction (described above), which provides both a standard API and flexibility insofar as protocols and integration is concerned. In the discussion that follows, an example message node is first described in connection with FIG. 6. Following this, an example of how message nodes can be connected together is provided to illustrate the flexibility and robust interconnectivity that the described architecture provides.

Figure 6:
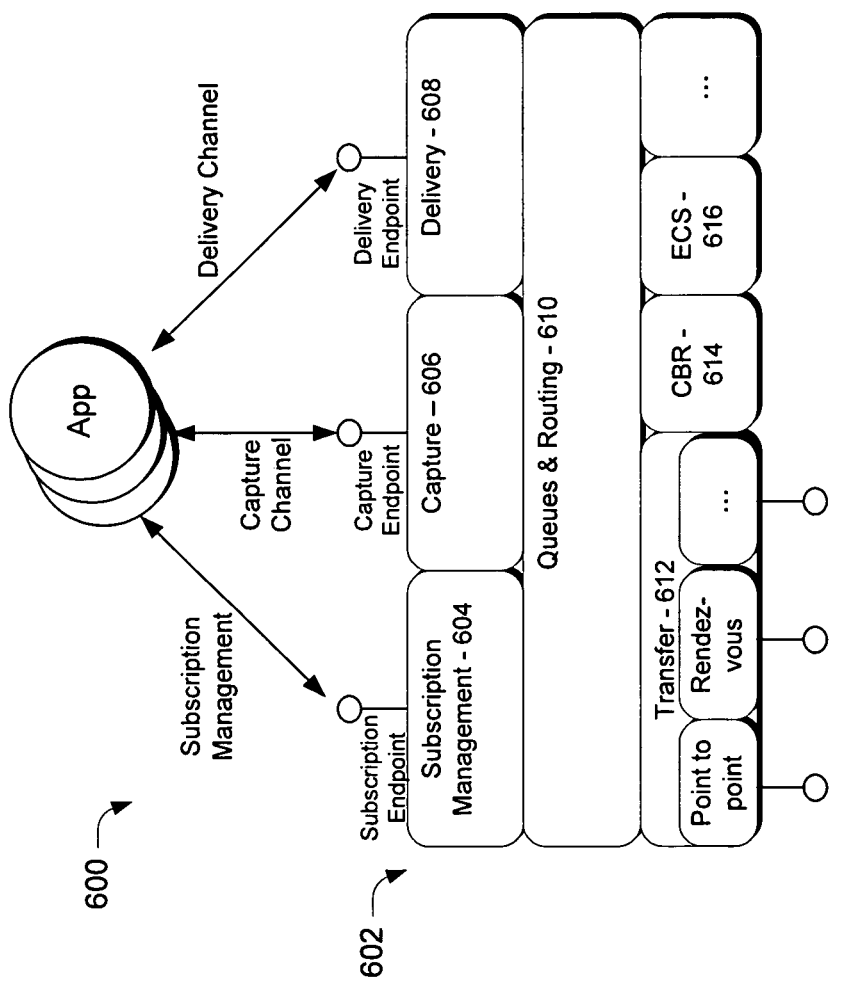
FIG. 6 illustrates an example messaging services node in accordance with one or more embodiments.

As but one example of an architecture that can be utilized to implement the functionality described just above, consider FIG. 6. There, a system 600 includes a so-called individual message node 602. Message node 602 includes, in this example, a number of components or constituent parts. Specifically, a first layer of the node includes a subscription management component 604, a capture component 606 and a delivery component 608, each of which exposes a flexible set of application program interfaces (APIs) to implement its functionality. This layer deals primarily with processing messages coming into and going out of the node.

Specifically, in this example, subscription management component 604 represents a subscription endpoint and is responsible for managing registrations for messages and other events. For example, a message node may register for messages or events from one or more different applications as shown. Capture component 606 represents a capture endpoint that is responsible for receiving messages that are given to the node. Delivery component 608 represents a delivery endpoint that is responsible for sending or otherwise delivering messages from the message node.

A second layer of the node includes a queuing and routing layer 610 that is responsible for queuing messages and events and routing the messages and events to the proper entities. Pub/sub can also take place at this layer. Further, in at least some embodiments, functions such as filtering and transformation can also be implemented at this layer. Filtering involves comparing messages to a standing query, and only passing them through the delivery component if they satisfy the query. Transformation involves registering a map that translates an incoming message before sending it through the delivery module. Transformation might act on a single message (i.e., translate all strings into a particular format), or on groups of messages (e.g., someone may ask for the average of integers in messages over groups of hundreds of messages).

Further, in one or more embodiments, individual queues and pub-sub topics can be named in terms of channel addresses. Filter and transformation channels in the channel stack can attach filters and transformations to message properties in the local stack, which can then be communicated to the message service node by the message service transport channel. When a message is delivered, the transport marks a flag in the message if the channel stack's filters and/or transforms have been applied. The filter and/or transformation channel only needs to act on the outgoing message if the transport did not.

The third or bottom layer of node 602 includes various components that can be used to connect up with other nodes. For example, a transfer component 612 can be used to connect in a point-to-point manner with other nodes. Alternately or additionally, transfer component 612 can be used to connect into a rendezvous network which runs against the service bus. Further, transfer component 612 is extensible in that it can be used to connect in a variety of other manners.

In one or more embodiments, the third layer includes a content-based routing module 614 that can implement content-based routing. Content-based routing pertains to the notion of sending content to other nodes based on the particular content, as will be appreciated by the skilled artisan. This can allow for streamlined processing for large distributed queuing systems in the node. For example, if a message is sent into a pub/sub system and the message pertains to the weather in New York state, then it is unlikely that someone in California cares about the message. Hence, content-based routing might then send the message to computing devices in New York state only.

In one or more embodiments, the third layer includes an event correlation services component 616. Component 616 can allow for a rich set of services such as retaining messages over time, operating on the messages and then, responsive to a particular event, sending the message out. For example, in one or more embodiments, each message service node has an event correlation services component that can be programmed to act on message streams in certain ways while the message streams are in flight. With regard to the "stream" part, consider the following. In one or more embodiments, the event correlation services component interacts with the queues in the system and so can act on a historical series of messages, as well as individual messages. The functions that the event correlation services component can apply to messages or streams of messages include transformation and filtering as mentioned above in the less specific case.

Further, in one or more embodiments, the event correlation services component can take a relatively straightforward abstract request (e.g., "measure the average response time for a message call") and translate it into operations running on a distributed set of event correlation services modules. This, in a sense, pushes calculation "upstream". For instance, if the calls are happening on a large number of machines, event correlation services nodes on each machine can calculate the average for calls on their own machine, and then send periodic messages on downstream containing the average and the count of calls at that node. This can drastically reduce network load when compared to the less distributed alternative, which involves sending "in/out" messages for each call back downstream.

Figure 7:
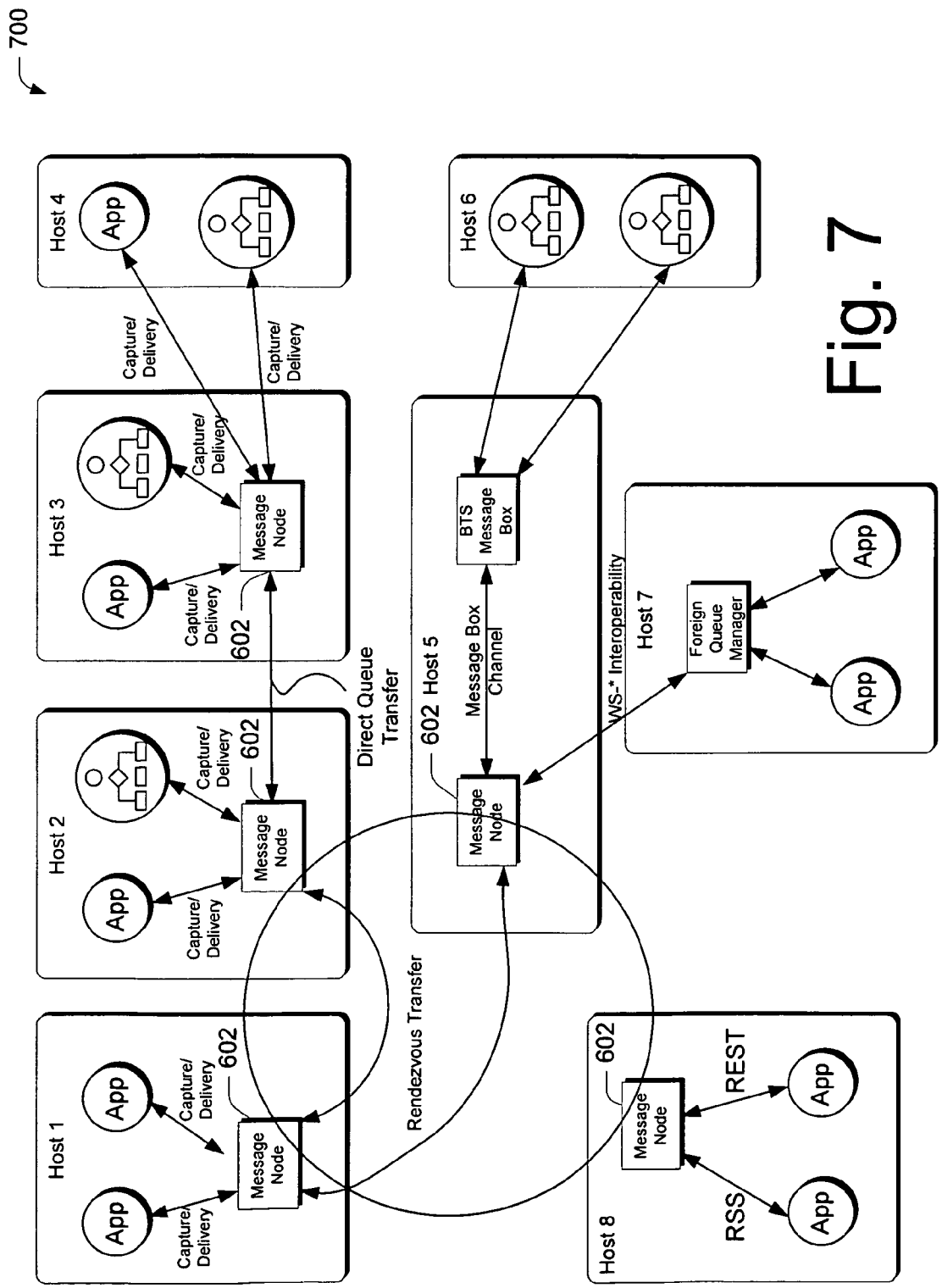
FIG. 7 illustrates an example messaging services interconnection in accordance with one or more embodiments.

Having described the notion of a messaging node, consider now various ways that messaging nodes can be connected together in connection with FIG. 7. There, a connectivity environment 700 is shown generally at 700. Environment 700 includes a number of different connectivity paradigms in accordance with one or more embodiments. Here, there are a number of hosts—hosts 1-8, individual ones of which are running message service nodes 602 (FIG. 6).

In this example, starting at the upper right side of the figure, host 3 is running a message node and, because the interfaces associated with this node are distributed interfaces, host 4 can use the message node system by simply sending messages directly to the node on host 3.

Hosts 2 and 3 illustrate that two nodes can be directly connected using the transfer component 612 (FIG. 6). Accordingly, a message that might be captured on host 2 can be inserted into the system. If the message satisfies a subscription on host 3, the message can simply be sent to host 3.

Broad collaborative scenarios, such as SOAP scenarios where many different people can collaborate, can be supported by a connection such as the one shown between hosts 1, 2, 5 and 8. This connection constitutes a rendezvous circle and is an example where message nodes have plugged into the service bus and have built on top of the service bus. Once plugged in, when one of the nodes captures a message, the node can multicast the message to all of the other nodes that are participating in that circle. Thus, many different services can become connected and receive broadcast messages. This particular arrangement can very quickly route messages to members of the circle, where the member nodes can receive, process and, if appropriate, route the messages to other members in an efficient and streamlined manner.

Thus, in the above examples, the relationship between hosts 3 and 2 illustrate how, on a small scale, direct connections can be utilized. The circle, on the other hand, illustrates how message service nodes can be utilized in broader scenarios.

Hosts 5, 7 and 8 illustrate other scenarios. For example, host 5 illustrates how proprietary protocols can be utilized to communicate with other pub/sub systems—here, a BizTalk Server. Host 7 illustrates how other interoperable protocols, such as WS-* Interoperability protocols, can be used to communicate between the message service node and some other foreign queue service that also happens to understand the interoperable protocol, which service can then deliver messages to their own application in whatever form they like.

Host 8 shows how, even though the message service node has its own capture and subscribe process, the node can also connect to communicate in generally standard ways, such as through an RSS feed or through a REST connection.

Having now discussed the connectivity services component 102 (FIG. 1), consider now the process services component 104 (FIG. 1).

Process Services Component

In one or more embodiments, process services component 104 serves as a host that includes features that are used to run long-lived stateful operations such as workflows or rule sets. The process services component includes a workflow/rules runtime 118 that can run workflows or rule sets. Thus, the process services component provides an integrated collection of frameworks and services providing a runtime environment in which programs run. The runtime environment includes, by way of example and not limitation, activation, scheduling, error handling, state management, interfaces with the environment and the like. In one or more embodiments, all programs run in runtime environments, according to this definition. There is an unmanaged runtime environment in which one can run, for example, Win32 applications. Additionally, there is a managed runtime environment in which one can run common language runtime (CLR) applications. In the present example, the runtime environment can run code services, but is tailored to run models (e.g., workflows, rule sets, and the like).

Figure 8:
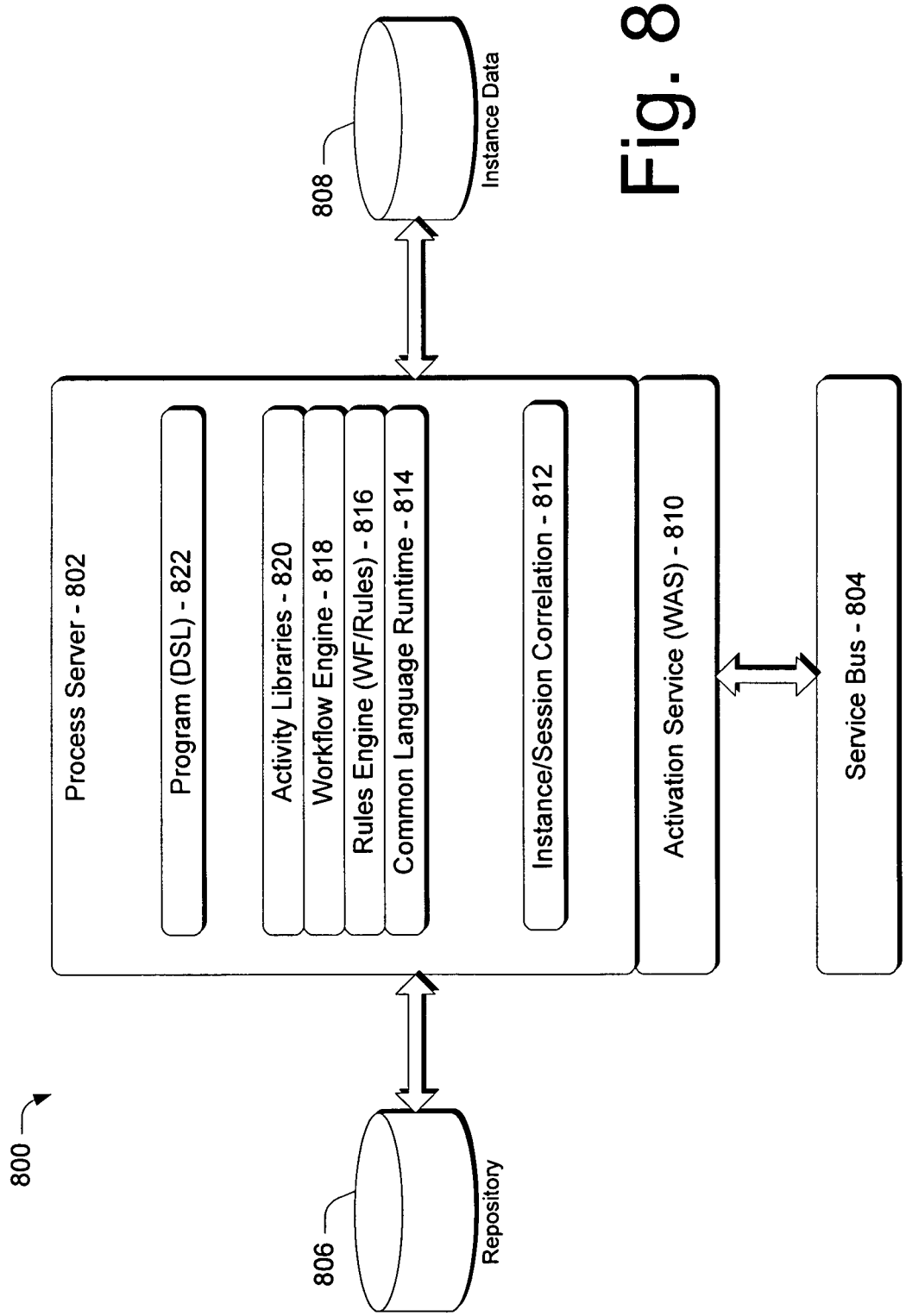
FIG. 8 illustrates an example process services component in accordance with one or more embodiments.

As an example of a process services component, consider FIG. 8 which illustrates an environment in which a process services component can operate in accordance with one or more embodiments, generally at 800. In this example, environment 800 includes a process server component 802, a service bus 804 (described above), a repository 806 (described below) and instance data store 808.

In this example, process server component 802 is used to run applications, native code, or rules or workflows. That is, in one or more embodiments, the process server component can run declarative code (e.g., graphical workflows and the like), as well as imperative code (e.g., C#). The process server component can run "stateless" processes with a lifetime equal to a single invocation and it can run processes that are long-lived, i.e. processes that live across many invocations separated by potentially long periods of time.

The constituent parts of the process server component include, by way of example and not limitation, an activation service 810, instance/session correlation component 812, a run time environment that includes a common language runtime component 814, a rules engine 816 (that runs activities contingent on changes in state), a workflow engine 818 (that allows specification of either single activities or graphs of activities that will be run by the rules engine), and activity libraries 820 (that constitute pre-defined or pre-configured activities). The process server also includes domain specific language programs 822.

In operation, in this example, all of the messages that arrive to trigger work at the process server component arrive off of the message or service bus 804. The instance/session correlation component 812 examines incoming messages and decides whether they can be routed to an existing instance of the runtime and the user application module. These instances might be in memory, or they might be on disk. The activation service 810 also creates new instances of the runtime and the user program as required by the incoming message stream (i.e., a new instance is created if an existing instance is not already suitable). The process server has a runtime suitable for declarative programs (workflow, rules), managed imperative programs (C#, VB.NET), and unmanaged imperative programs (C++, C). Additionally, the process server has actual programs (which may or may not be DSLs).

When a message arrives from the service bus, the instance/session correlation component 812 decides whether a running runtime instance is acceptable or whether a new runtime instance is appropriate. The activation service's responsibility is to provide a new environment, where appropriate, that can be used to run the process for which the message has been sent. The activation service is communicatively linked with repository 806, where all of the applications, models and rules and workflows reside. When a message arrives and the activation service knows that it needs to start up a new application, the application is pulled out of the repository 806.

In one or more embodiments, processes can be very long running and, because of this, when messages arrive, instance/session correlation component 812 processes the incoming message and attempts to associate it with a process that may be running. When it find the appropriate process, component 812 retrieves the current state of the process out of the instance data store 808, loads the process, and then runs the next part of the workflow.

Processes can be built using a rich collection of resources. Specifically, processes can be built using common language runtime (CLR) component 814. Rules engine 816 provides a workflow foundation and can be extended to run a process using only rules. Thus, programs can be built using only rules. Workflow engine 818 can be built on top of rules and, on top of this, activity libraries can be built sufficient to enable developers to write programs without writing any code thus providing, in at least some instances, a program comprising packaged components and models. The program is an executable model. The model can be represented graphically, as a text language, or in the repository. In the illustrated and described embodiment, the CLR is the common language runtime that makes up the core of .NET. The CLR is a virtual machine and a runtime that together can execute the logical opcodes into which C# and VB.NET code are compiled. Rules are condition/activity pairs. Conditions are connected to data which can sometimes be fixed data and sometimes be data that is presented to the rules. The activities fire when the rule matches its data.

The relation between the CLR and this particular system is best seen when considering what constitutes an activity. Specifically, an activity is either a portion of code implemented against well-known instances (i.e., code that is invoked when the rule is satisfied) or graphs of rules/activities that act as if they were a collection of code. The activity libraries 820 are equivalent in a sense to the base class libraries that come with .NET or the libraries that come with any other software environment, i.e. common libraries that one does not have to independently author.

Domain specific language (DSL) programs pertains to languages that are defined and utilized for particular subsets of tasks. Thus, one can generate DSL programs that are made up of subsets of rules or activities that make it convenient to build certain kinds of processes. Essentially then, DSLs are specific pre-packaged activities and rules that are restrictions or subsets of the more general system that make it easy to build particular kinds of applications.

Figure 9:
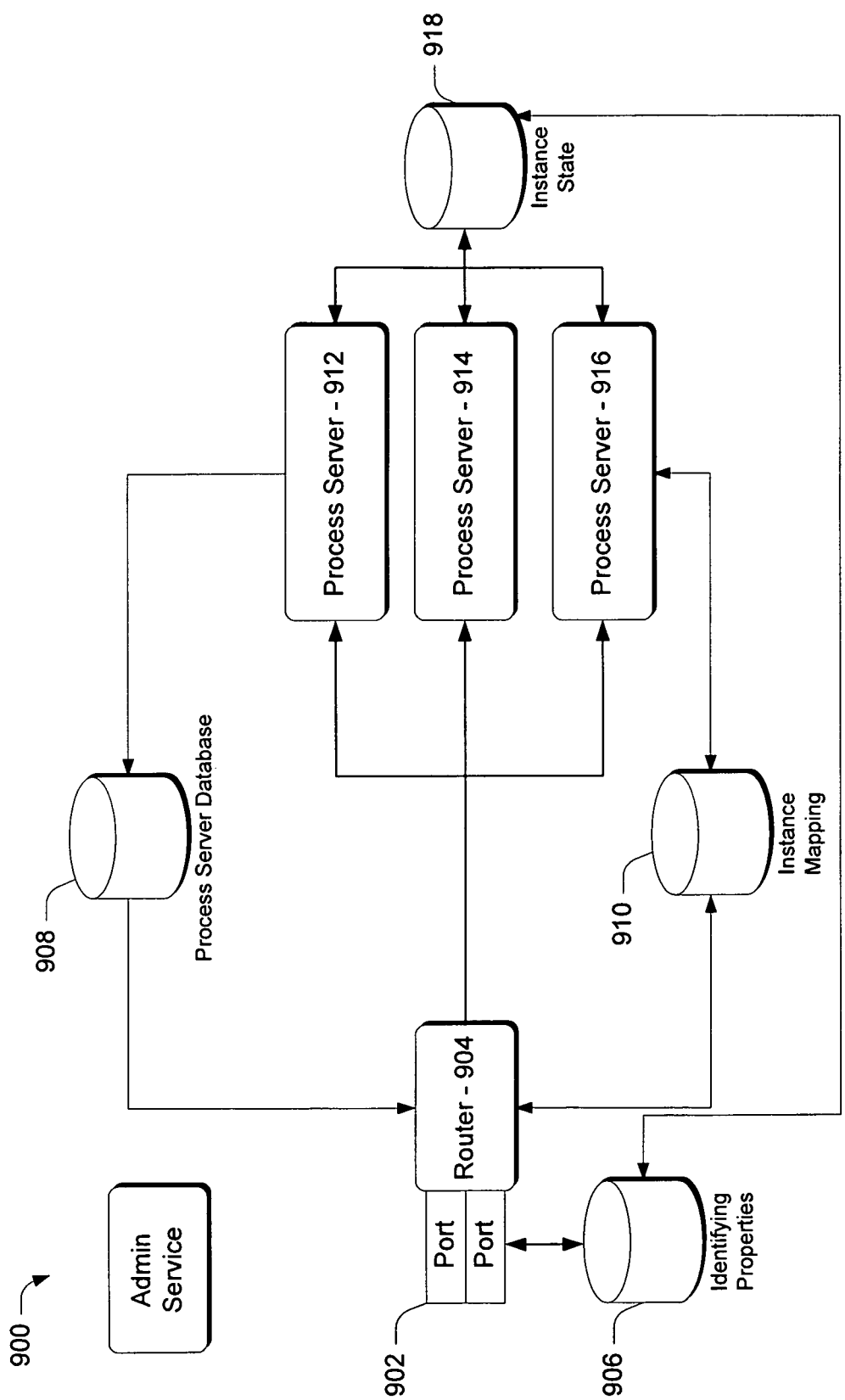
FIG. 9 illustrates an example process services environment in accordance with one or more embodiments.

Having discussed the general notion of a process server component, consider now how process server components can be employed in connection with FIG. 9. FIG. 9 illustrates how the system of FIG. 8 can be scaled out to multiple different machines. One of the problems addressed by the system of FIG. 9 pertains to how to get messages to the place that happens to be managing instances currently, in the context of a system in which instances can be recycled or lost due to machine failures.

There, an example environment is shown generally at 900. In operation, messages arrive off the service bus through so-called ports 902 associated with a router 904. Thus, messages flow through the port into a router. The ports are endpoints associated with the service bus and correspond to the channel stacks described in FIG. 2. The router, in this embodiment, has a function in a distributed world that is very similar to the instance manager in FIG. 8. The router figures out whether an instance is already in one of the process servers, or whether it is a new instance. If the message is for an existing instance, the router sends the message to the process server that holds the instance. If the message is for a new instance (or for an instance not currently pinned to a particular process server), then the router chooses a process server and then forwards it. The instance part of the process server maps to the router.

In at least some embodiments, protocols can be used to associate messages with instances of long running processes. In the illustrated and described embodiment, there are a couple of ways that this can work. For example, the message might contain headers for a particular instancing protocol. This makes it easy to deal with the instance-location logic. If, on the other hand, the message does not contain instancing protocol headers, then a mapping function creates the information that would be in the protocol based on information in the message that uniquely identifies the instance (e.g., a purchase order for instance). It can do this by utilizing a database of identifying properties 906. The properties can define how the message is to be mapped to an instance through a transform in the port. Continuing, messages come into the port and are then sent to the router 904. The router ascertains which process servers are running via process server database 908. In this example, this is done using a table that tracks running process servers. Instance mapping database or store 910 keeps track of instances that are associated with one of the process servers. The router ascertains which process server the message is to be routed to. This is done via an instance mapping store 910 that maintains a mapping of process instances to process servers. The router can then route the message to the correct process server which, in turn, can route the message to the correct instance. For an existing instance, the router 904 ascertains where the instance is running so that it can send the message to the right process server 912, 914 and 916. If the instance is new or if the instance is not currently mapped to a process server, router 904 selects a process server from among the running process servers. Alternately or additionally, the situation might be that it has been a long period of time (e.g. 3 weeks) since a message arrived for a particular instance. In this case, the particular instance may have been placed back in instance state store 918. If that is the case, the instant state is retrieved and pulled into the memory of an appropriate process server.

The link between the identifying properties store 906 and instance state store 918 is maintained to enable the identifying properties store to have a mapping of individual instances that are running.

Identity Services Component

In one or more embodiments, identity services component 106 (FIG. 1) includes, in this example, a directory services component 120 and an access services component 122. The identity services component provides services that can be used to perform relatively complex identity manipulations.

Figure 10:
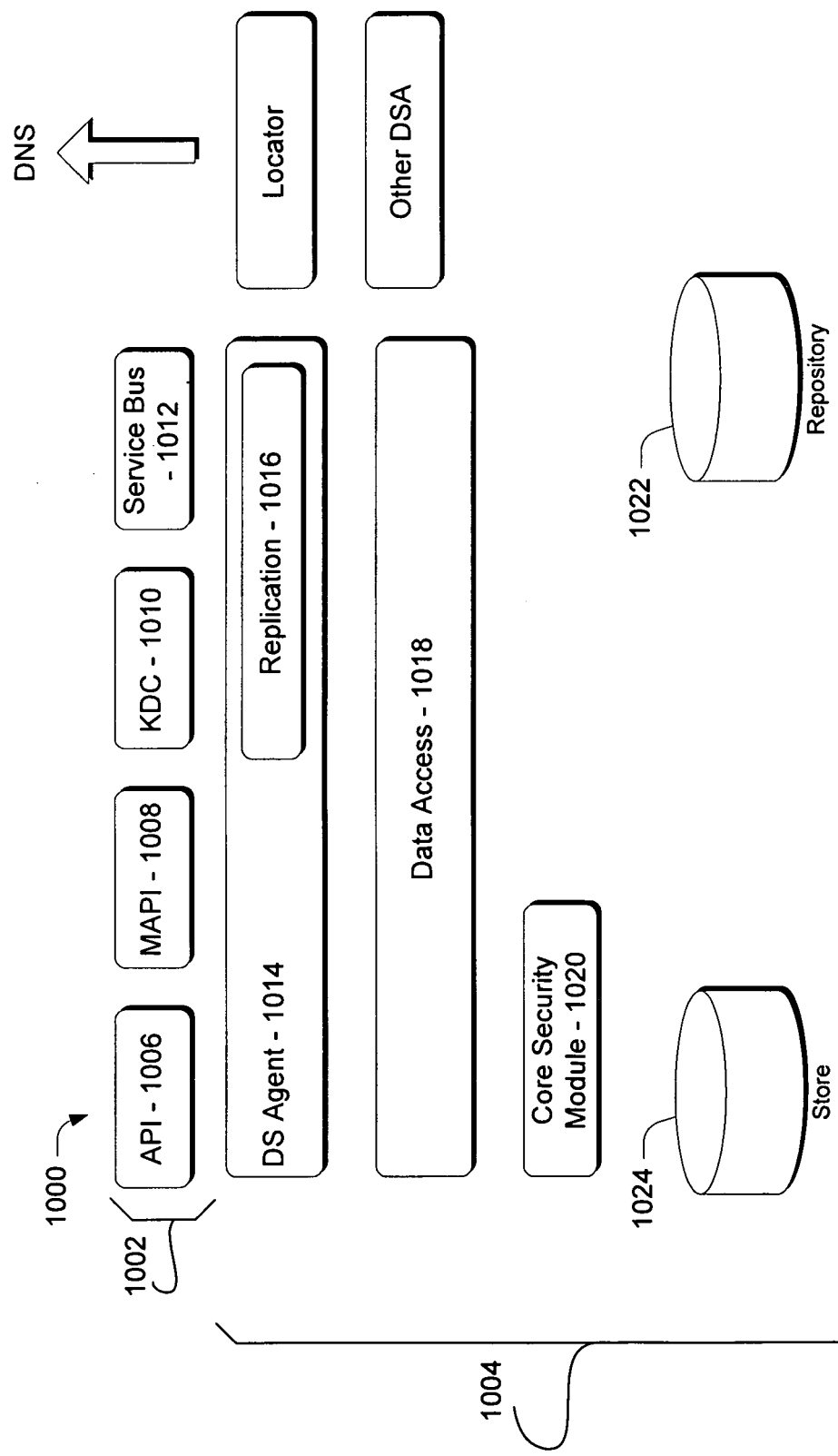
FIG. 10 illustrates an example directory services environment in accordance with one or more embodiments.

As but one example of a directory services component, consider FIG. 10 which illustrates an example system generally at 1000. In this example, the directory services component includes what can be considered as an access layer 1002 and a directory stack 1004. Access layer 1002 includes one or more components through which the directory stack can be exposed. In the illustrated and described embodiment, these components include an API component 1006, a Messaging API (MAPI) component 1008, a KDC component 1010 and/or a service bus component 1012.

API component 1006 can be considered as a legacy API or a standard API which can optionally be used to access the directory stack. Here, APIs of the API component are more specifically linked to the data that is available in the directory stack.

MAPI component 1008 refers to programming interfaces that are used by MAPI subsystems, by client application writers, and by service provider writers. The main programming interface is an object-based interface known as the MAPI programming interface. Based on the OLE Component Object Model, the MAPI programming interface is used by the MAPI subsystem and by messaging-based client applications and service providers written in C or C++, as will be appreciated by the skilled artisan.

KDC component 1010 is a key distribution center that contains policies that map between identities in the directory and security keys that can be issued for a particular individual. When an individual approaches the directory, they typically ask for a key. A policy is run against the individual and a key may or may not be returned depending on the policy.

Service bus component 1012 can be utilized to access the directory stack 1004. Here, the service bus component includes a set of more generalized APIs that can allow communication with a wide variety of entities. The generalized APIs provide create, read, update and delete functionality for data in or accessible through the directory stack.

In the illustrated and described embodiment, directory stack 1004 comprises components including a directory service agent 1014 that includes a replication component 1016, a data access component 1018 and a core security module 1020. Further, the directory stack also includes a repository 1022 and a store 1024. In this example, the repository is the entity that stores data in a form that can be utilized by the platform described in this document. Hence, it can be considered as serving as a store for data in a "new format". Similarly, store 1024 serves as a store for what can be considered as legacy data or data that resides in a legacy format. In this particular example, core security module 1020 provides a security layer for store 1024 so that it presents correctly to data access component 1018.

The directory service agent 1014 can be thought of as a general layer that all the different access APIs use to interface with the database system. This software layer understands the location of other data stores in the system. As such, it uses this knowledge for data access (e.g., in a case where the APIs are trying to get some information that is not available in local stores), and it also uses this knowledge for replication (e.g., placing data in strategic locations around the network so that it can be accessed efficiently from where it is needed). This distributed access work takes place between various directory service agents (e.g., the "Other DSA" entity in the figure). Because this information happens to be available at this layer, the domain information is also provided from the directory service agent to the DNS system to keep track of machine names, IP addresses and subnets, and the like.

In this example, data access component 1018 is utilized to enable not only API component 1006 (i.e. the legacy API) to access data that it was not originally architected to access, but also allow service bus component 1012 to access legacy data.

Access services, through access service component 122 (FIG. 1), provide rich support for the management and use of identities within distributed applications. In the illustrated and described embodiment, the approach is centered around claims: claims about entities, claims about resources, claims about actions undertaken by entities on resources, and claims about the environments in which these actions might take place. Rules or policies can be expressed over these claims. These rules can then be evaluated in a variety of contexts: as a way of doing authorization checks for resources (is the entity allowed to look at the resource in the given environment?), or more generally, as business rules (has entity's manager authorized a purchase order of the given amount?). These rules can be completely processed locally, or they might lead to partial results that are passed to some federated processing authority for further analysis.

Figure 4:
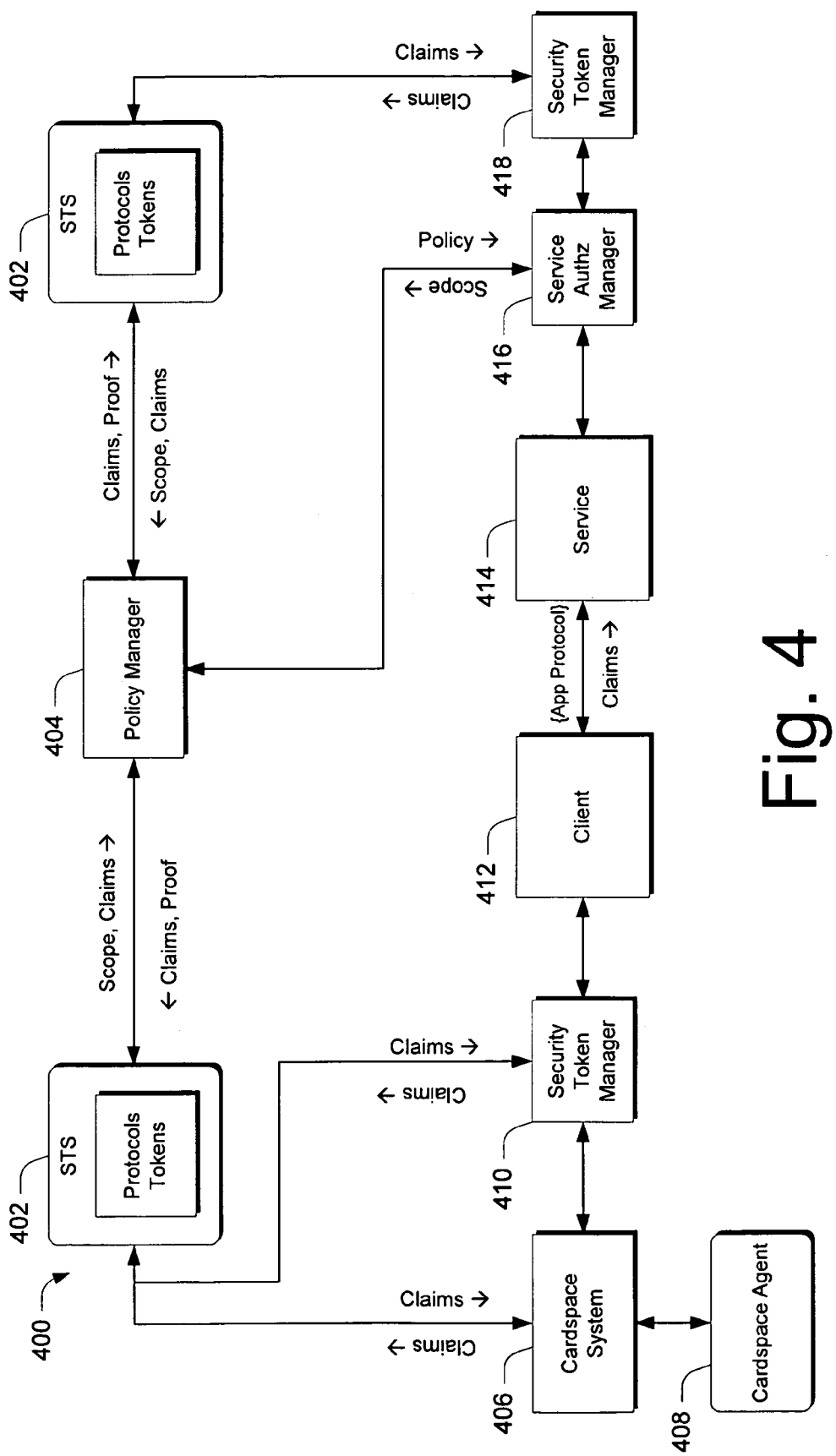
FIG. 4 illustrates an example security architecture in accordance with one or more embodiments.

In one or more embodiments, the access service component constitutes an extension of the FIG. 4 system that uses the power of the process server for the purposes described above and below. To this extent, the discussion that follows describes a specific application of the general architecture of FIG. 4.

Figure 11:
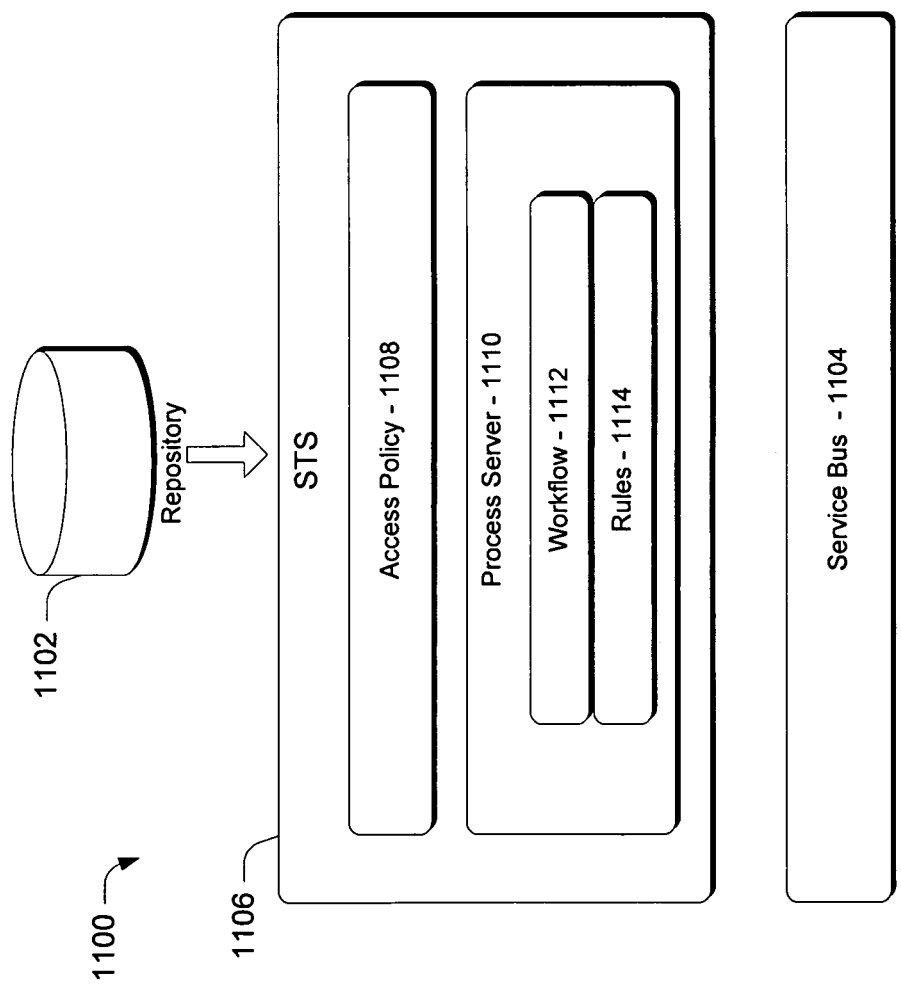
FIG. 11 illustrates an example access services environment in accordance with one or more embodiments.

As an example access service architecture, consider FIG. 11 which illustrates a system generally at 1100. Here, system 1100 includes repository 1102, service bus 1104 and server technology service 1106 logically interposed between the repository and the service bus. Here, service 1106 includes an access policy component 1108 and a process server 1110. The process server 1110 includes a workflow component 1112 and a rules component 1114. Here, access policy component 1108 contains relevant policies for accessing resources. Workflow component 1112 and rules component 1114 define or otherwise describe access relationships. These components run in a server to implement a server technology service that provides access to resources. Specifically, in one or more embodiments the access service, as implemented by the access service architecture, comprises a process server running a specific program with the appropriate interfaces to plug into the architecture of FIG. 4.

Lifecycle Services Component

In one or more embodiments, lifecycle services component 108 (FIG. 1) includes a repository component 124, an integration component 126, an executive component 128 and an analytics component 130. In the illustrated and described embodiment, these components work cooperatively to provide an environment in which a distributed, heterogeneous application can run.

Figure 12:
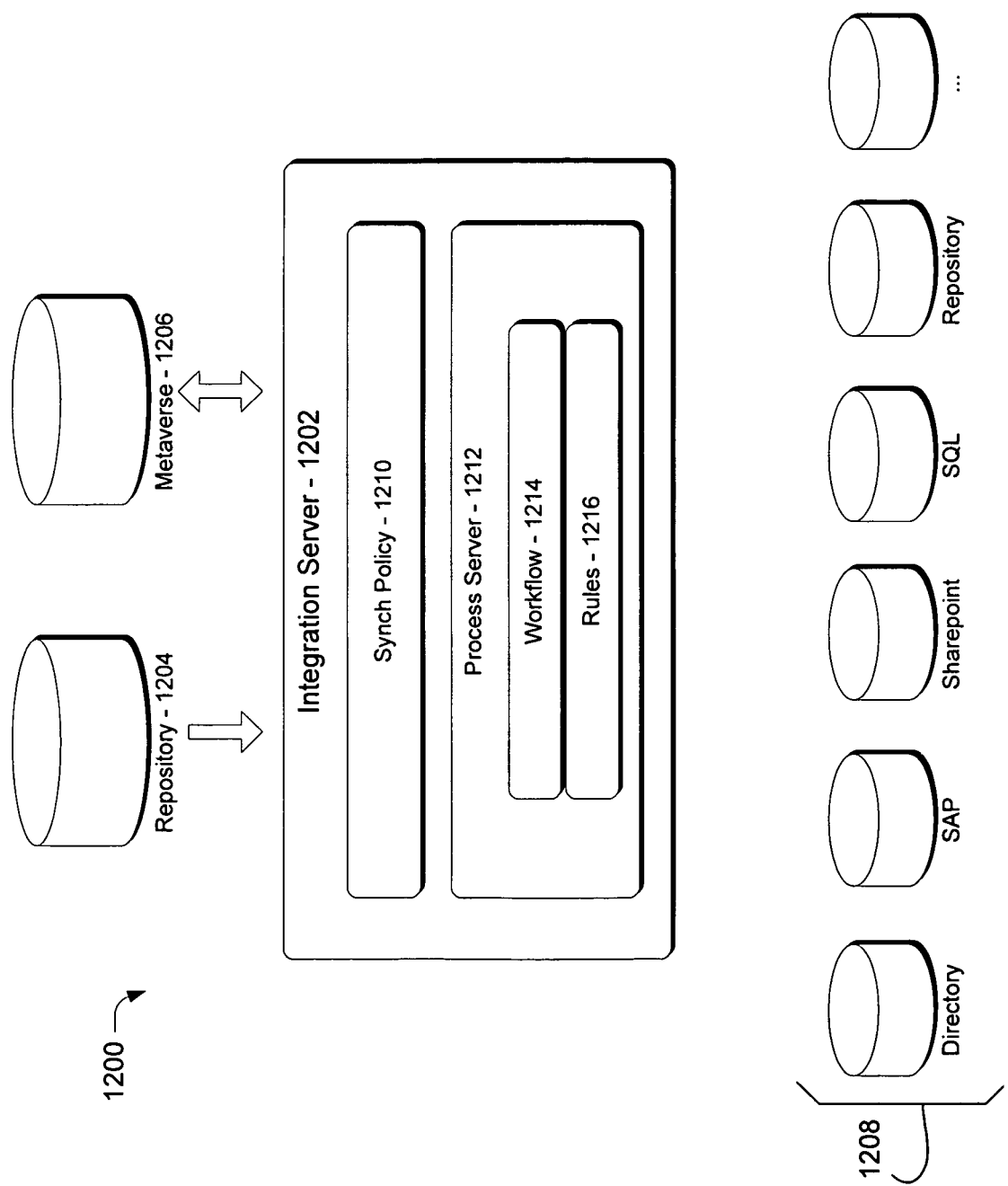
FIG. 12 illustrates an example integration services environment in accordance with one or more embodiments.

Consider first the integration component in connection with FIG. 12. There, a system 1200 includes an integration component in the form of an integration server 1202 logically interposed between a repository 1204, a metaverse component 1206 and a plurality of data sources 1208. One of the endeavors of the integration component is to be able reconcile data that may reside in different stores in an enterprise. To do this, and as described below, the integration component is able to "hook into" all of the different data stores that might be used across an enterprise. In addition, the specific types of declarative programs running in the integration component are aimed at implementing policies used by an enterprise to deal with potential conflicts. In addition, another of the endeavors of the integration component is to build a unified or single view for an application over data that resides at different locations, such as different databases, different LOB applications, and the like. Thus, in this endeavor, the application defines and establishes a working view of the data, identifies a mapping between the application's view and the underlying data stores, and then establishes policies for reconciling changes in the data stores with changes in the application's view. These policies typically reside in application logic.

To this extent, the integration server about to be described constitutes, in at least some embodiments, a modified form of the process server depicted in FIG. 8.

In this example, integration server 1202 includes a synchronization policy component 1210, and a process server 1212 that includes a workflow component 1214 and a rules component 1216.

In operation, data that is to be utilized by a particular composite application can reside in many locations some of which are illustrated by data sources 1208. Typically, however, programs expect to find data in one location, such as on a local computing device. In the illustrated and described embodiment, data can be accessed from a number of different places (i.e. data sources 1208), processed through synchronization policy component 1210 to a central location referred to as the metaverse 1206. The metaverse constitutes the view of the data that the application expects to see, and synchronization policy component 1210 is responsible for processing data from the various sources and placing the data in the form that the application expects to see. Once in the appropriate form, the application, whose constituent parts reside in the repository 1204, can operate on the data in the metaverse 1206.

Once the application has operated on the data in the metaverse, it can be flushed back to its appropriate data source. The synchronization policy component 1210, together with its process server 1212 and associated workflow and rules components 1214, 1216 work together to ensure that data is and remains synchronized. Once the data is synchronized, it can be pushed back out to its appropriate data source(s). With respect to the metaverse component 1206, consider the following. In the reconciliation scenario above (i.e. the first of the mentioned endeavors), the metaverse constitutes a data view that is the combination of all the data in all the systems being reconciled. The reconciliation policy is usually handled in terms of the metaverse schema and the original sources. In the unified view scenario (i.e. the second of the mentioned endeavors), the metaverse constitutes the view that the application cares about—that is, a specific subset of the data in all the surrounding stores that is relevant to the specific application.

Figure 13:
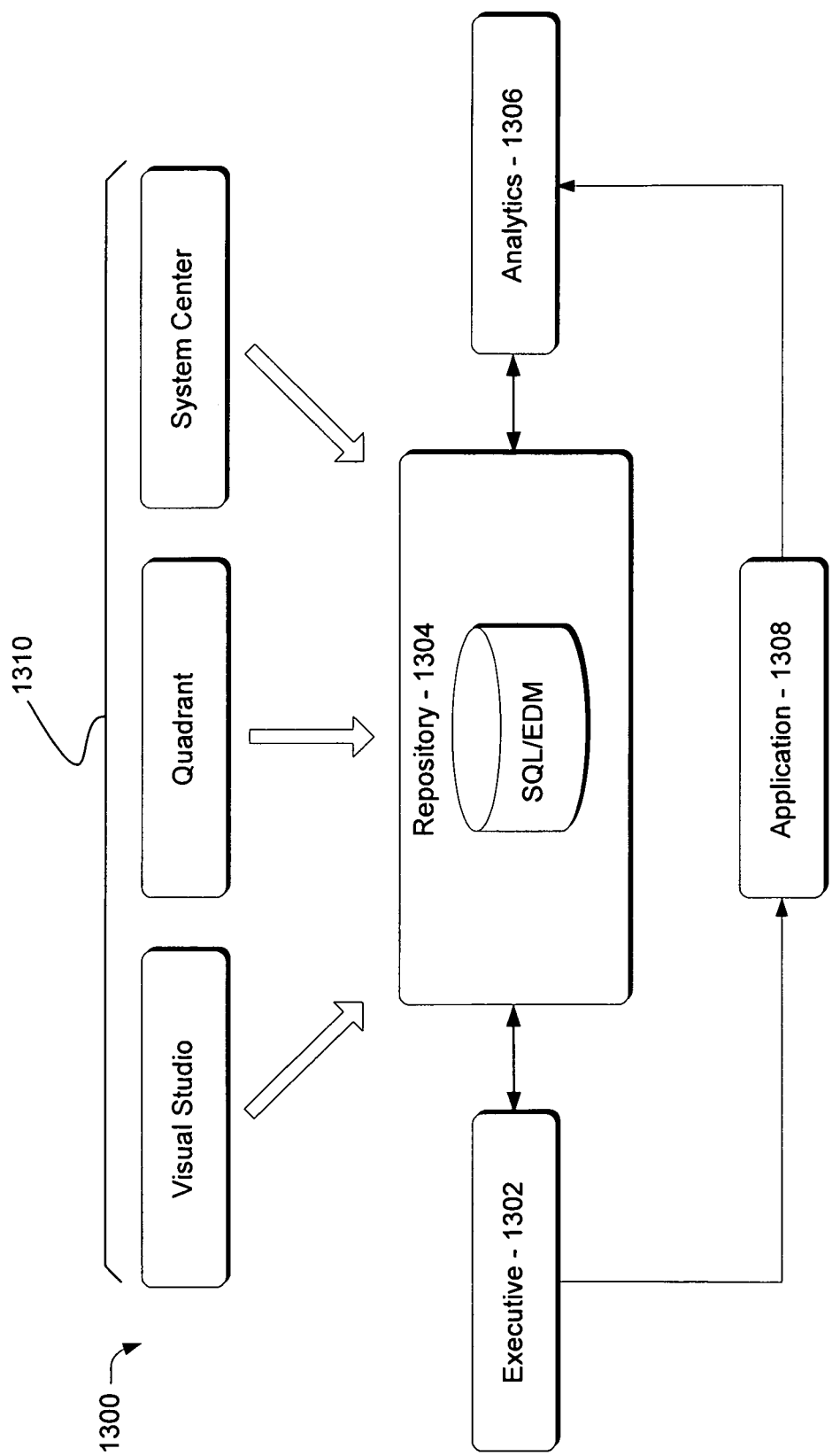
FIG. 13 illustrates an example application lifecycle services environment in accordance with one or more embodiments.

In one or more embodiments, part of the program that is executed can include portions that are executed by computing devices, such as the process server, and portions that are executed by individual people using a so-called people-ready process. An example of a people-ready process might be considered to be a process that a business might typically implement. In this scenario, part of the people-ready process might be to present a particular user interface, through a user interface process, that allows an individual to perform some of the work. For example, if a particular process involves three steps, A→B→C, in a fully automated process, A and B and C would be specified by code, rules or workflow. In a people-ready process, perhaps B sends mail to a person asking for a copy of a report, and C inserts a task into Outlook® asking for a manager to read the report and approve it. FIG. 13 illustrates an example application lifecycle services environment generally at 1300. Here, environment 1300 includes an executive component 1302, a repository 1304, an analytics component 1306, and application 1308 and a variety of authoring or development tools 1310 that feed into the repository.

Here, code modules can be written using a variety of the development tools 1310, stored in a source control system for testing, and ultimately published into the repository 1304. The source control system can be used for reasons that such systems are typically used, e.g., to keep track of history and revisions, as well as to flow into processes that build and test systems. The development tools can provide a number of different levels of granularity at which an individual can author code modules.

When an application is to be deployed, the executive component 1302 accesses the application from the repository 1304 and readies it for execution. To do this, the executive component makes decisions such as the machines on which the application will run, the transports that are to be used, security credentials, and the like. In this regard, the executive implements what is known as process refinement which, in this example, is driven by workflows. When the executive has completed its work and all deployment parameters have been decided upon, the application can run. To this extent, the executive component 1302 puts the connected application through various state changes. Such state changes can include, by way of example and not limitation, moving from a "built" state to a "refined" state, from a "refined" state to a "deployed" state, and/or from a "deployed" state to a "running" state. This generalizes, in a sense, the set of states that an application might go through. In the illustrated and described embodiment, individual state changes are implemented as a workflow that does the work of causing the state change.

In operation, the executive can distribute components of an application on different machines and then treat them as one logical unit. In one or more embodiments, the executive component can run components in different environments (e.g., IIS, WAS, BizTalk, SQL). These environments might be on different machines, but they also might be on different operating systems. The executive component is agnostic to infrastructure as compared to other technologies which are more oriented toward programming a coordinating infrastructure.

Thus, the repository 1304 brings diverse sources of information together, in particular, the models in the repository (including, centrally, the distributed model). The repository has adapters that let it plug into other data sources so it can provide a unified view of models to the infrastructure and to applications.

From the executive component's point of view, the repository provides a unified view of the application. The executive component's task is to get that application ready to run by refining it, by deploying it, by turning it on, and the like.

The diversity that the executive component deals with is the diversity of hosting and other infrastructure subsystems that the application needs to run in or on. To this extent, the executive can be thought of as federating this diversity, providing a view of a single logical host on top of all these different sorts of software infrastructure.

To avoid building knowledge of the specific kinds of infrastructure directly into the executive component, the executive component has models called "drivers" that it uses to deal with the underlying infrastructure. The executive component acts on the distributed model by generating instructions for each bit of the infrastructure and then sending the instructions to the corresponding driver. Individual drivers implement the same interfaces, so the executive component can deal with the underlying infrastructure abstractly by communicating to and with the drivers' interfaces.

One can think of this as the "command-and-control" part of the executive component. If one wishes to perform tasks in a distributed model, the executive component is notified. The executive component then analyzes the appropriate model and creates commands for each host and infrastructure module. It then sends those commands to the infrastructure via the drivers. So the executive allows one to think they are giving commands to the whole model, and hides all the diversity in the runtime environment.

Notice now the loop between the executive component 1302, application 1308, the analytics component 1306 and the repository 1304. One specific reason for the loop is that there is the notion of a service level agreement which defines how and when an application is to answer queries. For example, the analytics component 1306 can be queried to ascertain how quickly the application 1308 is answering queries or performing some other task. If the application's performance is not desirable or does not otherwise satisfy some performance metrics, then the model can be tuned in the repository so that the application can meet the performance metrics. The executive component 1302 can then update the running model to make the application more efficient. Thus, dynamic feedback loops can achieve goal oriented behavior and can make sure that application end users are receiving good performance. More generally though, in addition to supporting federated command-and-control, the executive component 1302 also supports federated intelligence-gathering about the application. To gather intelligence about an application, an "observation model" can be added to the repository 1304 as part of a distributed application model. The executive component analyzes the observation model, ascertains what data should be gathered at each part of the application, and pushes those requests into the drivers. The drivers then perform whatever tasks are used to make their part of the system gather the appropriate data.

As the application runs, it emits events in each of its parts. The events emitted by each part can typically be in different formats, e.g., databases emit one sort of event, web pages a second, and so on. In the intelligence-gathering side of the application, the task of the drivers is to gather those diverse events, transform the events into a generic format, and insert the transformed events into the analytics component 1306. The analytics component does processing on the events according to the observation model. For example, if asked to report on average response time, the analytics component would turn "enter" and "exit" events into response time events, and then average them. These results would eventually be available through the repository 1304. Thus, what happens is that a set of events correlated to the application and the observation model is generated by the executive component.

The service level agreement example above constitutes a particular, specific use of this system. Service level agreements are implemented as observation models to measure relevant data and event handlers that watch the event flow coming out of the analytics component and to take some action if the agreement is violated. That action might, for example, constitute a human process (e.g., an email sent to somebody, an alert generated on a portal and the like) or, the action might be an automated process such as re-tuning the application.

Figure 14:
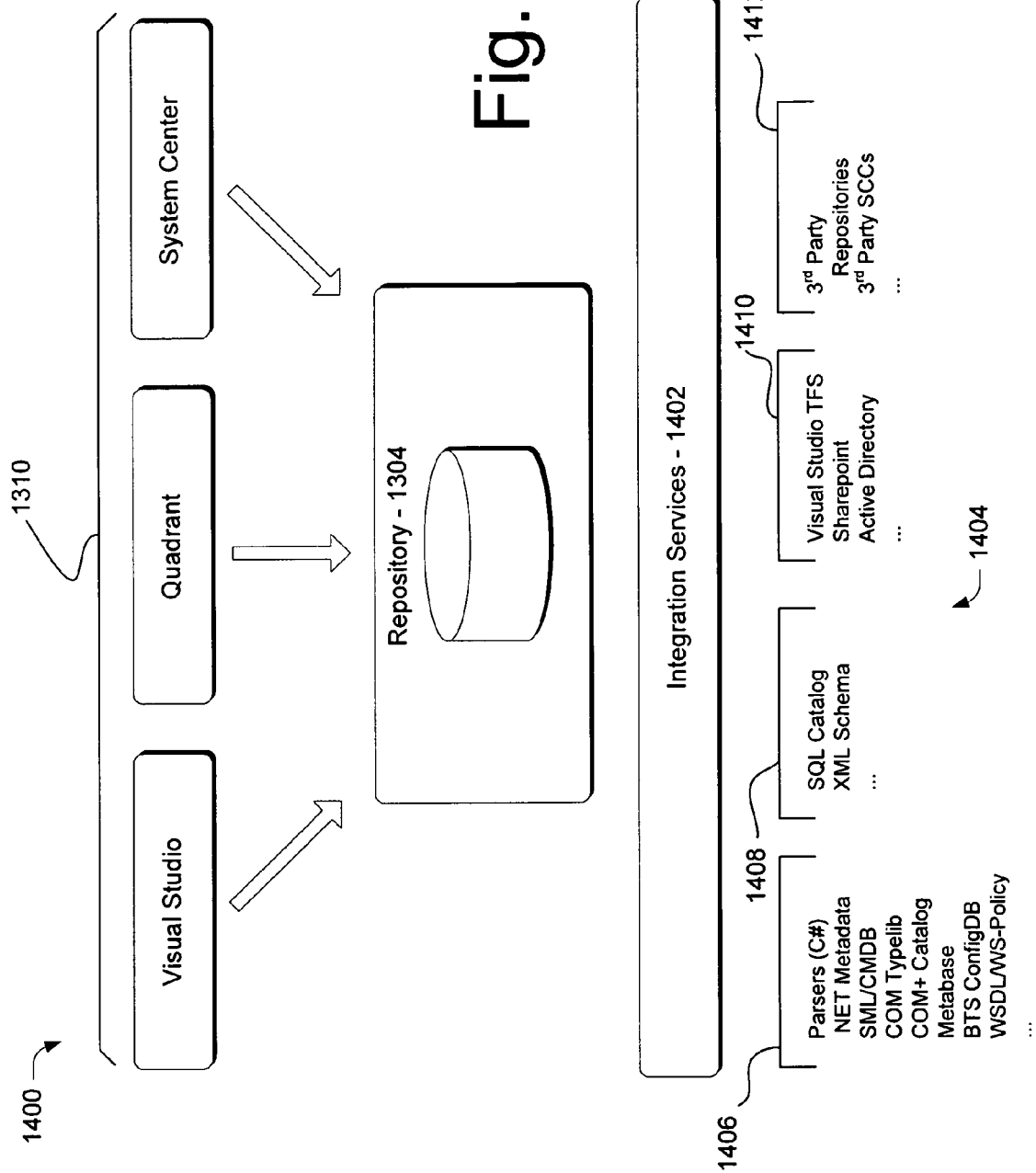
FIG. 14 illustrates an example repository in accordance with one or more embodiments.

FIG. 14 illustrates an example repository environment in accordance with one or more embodiments, generally at 1400. Here, a repository 1304 is shown logically interposed between development tools 1310 and an integration services component 1402. The repository includes information about an application and its performance, lifecycle, requirements, and all other relevant information. As such, the repository 1304 can receive its data from a variety of sources generally designated at 1404. For example, application data can be described using a variety of different mechanisms such as those indicated at 1406. Alternately or additionally at 1408, a SQL catalog may be germane if an application uses SQL tables or stored procedures. Alternately or additionally at 1410, application data may be described using a variety of source code control systems or third party descriptions at 1412. Thus, development tools 1310 typically have a primary relationship with the repository and the repository has a primary relationship with the other data stores. The repository produces a federated view across these different data stores using the integration service component.

In one or more embodiments, integration services component 1402 can process all of this data and make it visible through the repository 1304. In practice, the repository can be implemented as a SQL application. Accordingly, the API utilized to access the repository can be a SQL API. As an example of how this can all work together, consider the following. Suppose an application has a web page, a workflow, and a database. A user might typically use an existing tool to build the web page and the database that stores those artifacts in source code control. The user would use a modeling tool to build the workflow and the distributed application model in the repository. The distributed application model points out at the web page and workflow in the source code control system. When the executive component goes to read the model, the repository 1304 makes it seem like the web page and database descriptions are in the repository, when in fact the descriptions reside in other stores and are bridged out to the repository via the integration services component 1402.

Figure 15:
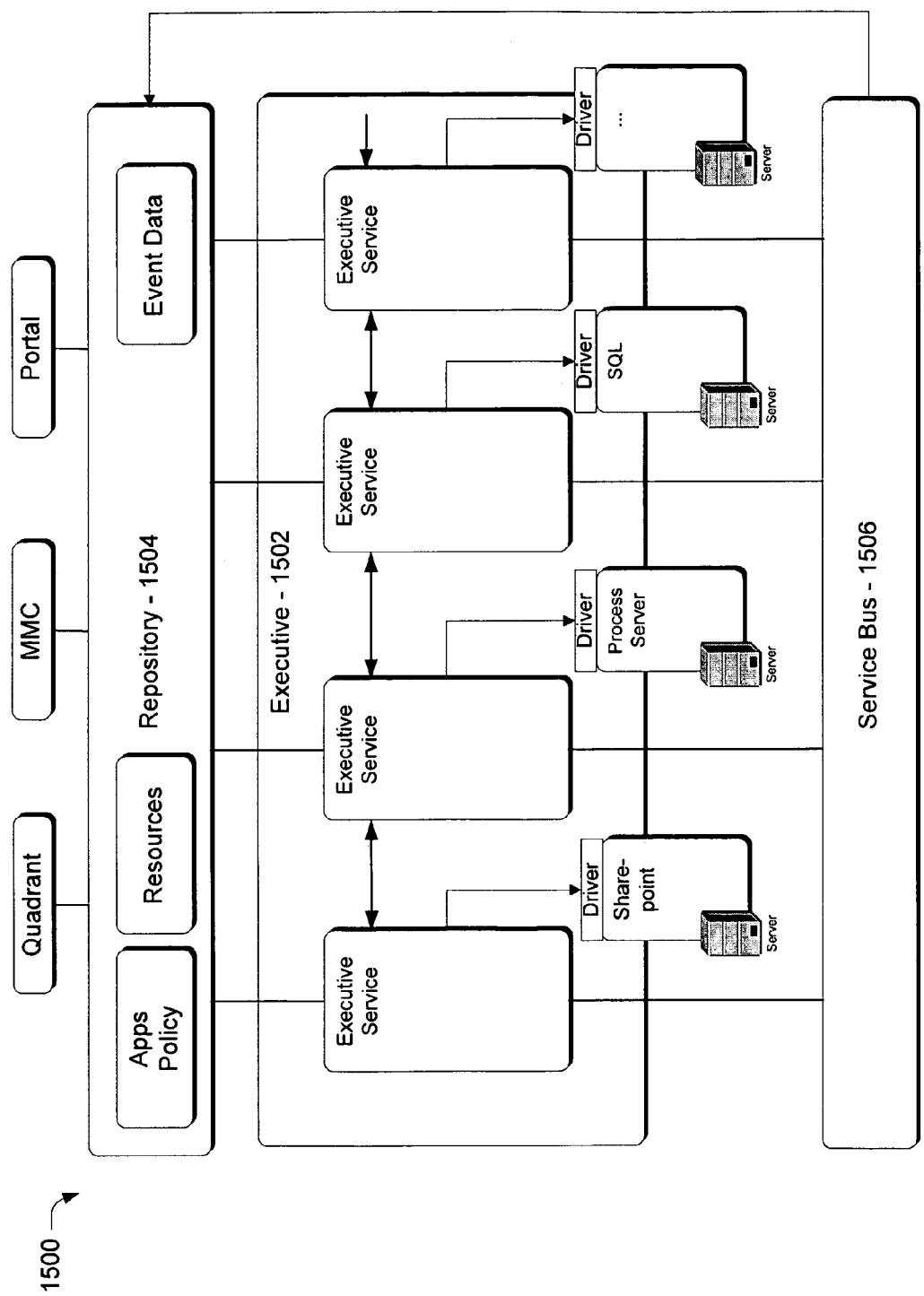
FIG. 15 illustrates an example executive component in accordance with one or more embodiments.

FIG. 15 illustrates an example executive environment in accordance with one embodiment, generally at 1500. Environment 1500 includes, in this example, executive 1502 logically interposed between repository 1504 and service bus 1506.

In one or more embodiments, executive 1502 federates hosts or containers such as SharePoint, IIS/WAS, BizTalk, and SQL Server to provide application-scoped (i.e. the entire application) command, control, and monitoring for distributed applications. Among the functions that the executive 1502 performs are, by way of example and not limitation, translating command and control requests at the scope of the whole model into command and control requests on the containers in which parts of the distributed model will run. In the illustrated and described embodiment, this translation is driven by workflows implementing customizable business processes. In addition, the executive 1502 translates observation models specified at the scope of the whole models into requests that individual containers generate specific sorts of events. As those events are generated in the containers, the executive translates them back into a standard format and sends them via the service bus 1506 to a performant store exposed as part of the repository 1504. The executive 1502 supports changes to some of the configuration of parameters of running models in real time, so that applications can be tuned and observation models can be changed without restarting the underlying applications. By supporting the ability to apply verbs like "Deploy" and "Run" to models, and by aggregating observed information about the models, the executive federates existing containers and provides the experience of distributed models running on a single system.

Turning more specifically to the FIG. 15 illustration, repository 1504 holds applications and policy assertions which are the rules that the application follows. The repository also includes all of the resources that are associated with an application, e.g., this particular application can run on these particular eight computers, four SQL servers and two web servers. These applications, resources and other repository data can be accessed in a number of different ways. For example, access can occur through a portal, through a management console (MMC) or through Quadrant (or some other modeling tool targeted directly at the repository). Accordingly, the executive is the entity that accesses applications from the repository and refines, deploys, starts, stops, versions and performs other functions with respect to the applications.

In operation, the executive 1502 is made up of a number of different services each of which can run of different machines. In this particular example, the deployed application model may be a Sharepoint application with a process administered by a process server and a SQL database as illustrated. The executive typically takes the application model and performs some refinements, such as ascertaining which particular SQL and process servers are going to be used and the like. After ascertaining which particular servers or services are to be used, the executive knows which drivers to use for deployment and can then deploy the model. The executive's driver management functionality provides the executive with the ability to deal with all of the different places that an application may run, e.g. Sharepoint, SQL, COM+, SQL, Windows Shell and the like.

Thus, an application resides in the repository and is built from conceivably many different component modules. The executive understands these modules, acquires the modules or knowledge of the module, and deploys the module out to the location where the modules are to run.

These component modules can then use the service bus 1506 for two different purposes. First, the component modules can communicate with one another using the service bus. In addition, the component modules can acquire relevant event data and use the service bus to provide the event data back into the repository via an analytics component such as the one in FIG. 13. This enables an observation model to be employed in connection with the application. The observation model provides instructions to the application modules running in the hosts telling them which events should be generated. The observation model also instructs the analytics component on how to post-process the events so that they answer the observation requirements of the observation model. Thus, the observation model selectively gathers information about an application that can be used to conduct analysis that pertains to that application's execution. Such information can be used to refine the application or to make changes on the fly that improve the application's execution. Such information is more generally useful for such things as logging, governance, monitoring and the like.

Figure 16:
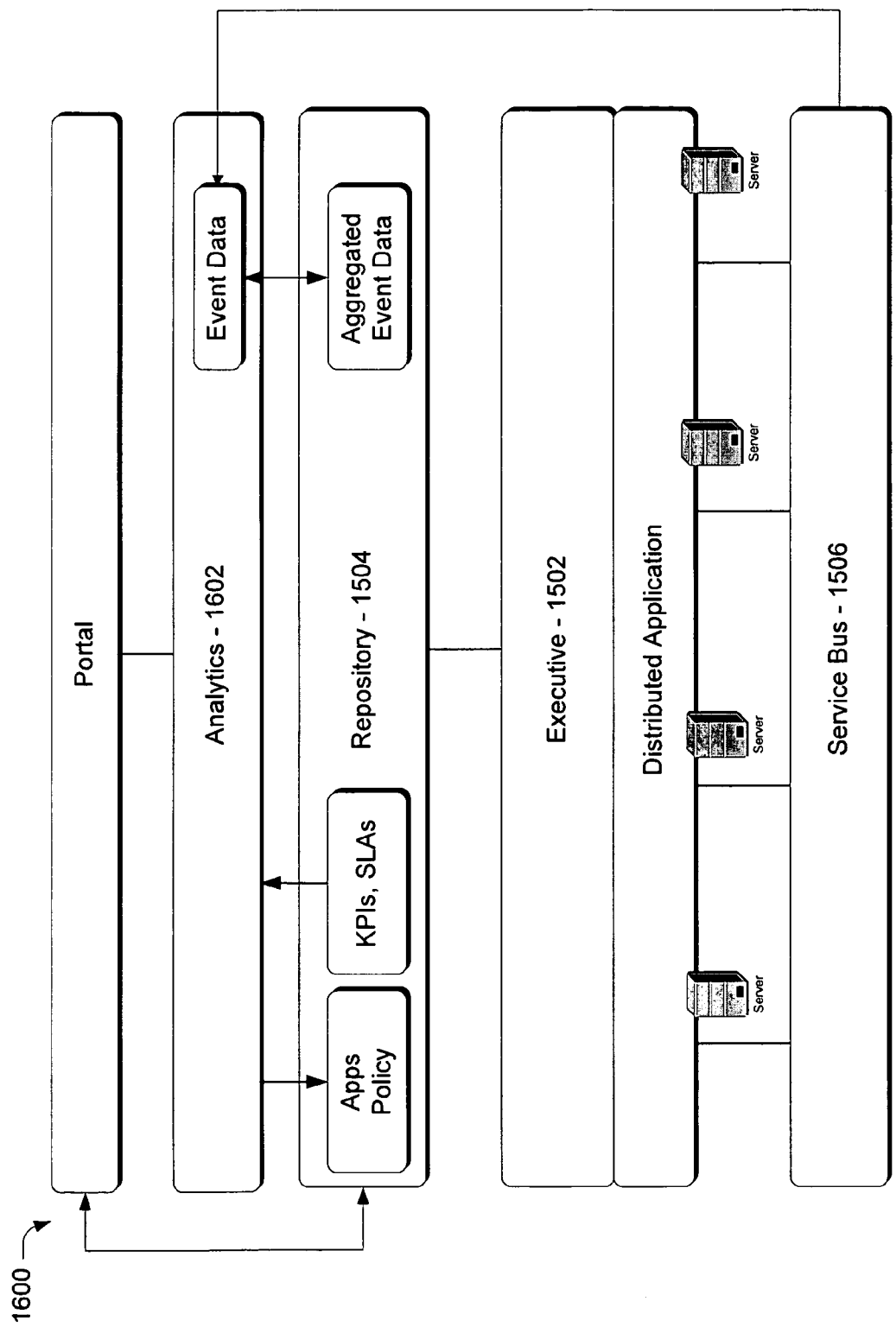
FIG. 16 illustrates an example analytics services environment in accordance with one or more embodiments.

FIG. 16 illustrates an example environment in accordance with one or more embodiments, generally at 1600. Here, like numbers from the FIG. 15 embodiment have been used where appropriate to depict like components. In addition to including executive 1502, repository 1504 and service bus 1506, environment 1600 includes an analytics component 1602 that comprises what can be considered as part of the system's analytics services.

Specifically, here, analytics component 1602 is configured to read event data (i.e. event instances) from the repository 1504 and act on the event data in some way. Recall that the event data was previously developed and provided into the repository via the service bus.

In operation, analytics component 1602 can process the event data in any suitable way. For example, the analytics component can run statistical analysis on the events in order to answer questions about an application's performance. In addition, users can access the data developed by the analytics component via a portal which provides a user interface that describes how a particular application is operating.

In addition, the analytics component can also be configured to read key performance indicators (KPIs) and service level agreements (SLAs) and use those in its analysis of an application's performance. Such can then be used to improve application performance by, for example, reconfiguring the application or one of its components and redeploying the application.

Tools Component

In one or more embodiments, tools component 110 (FIG. 1) includes a various tools examples of which include a code-based tool such as visual studio component 132, a model-based tool such as a quadrant component 134 and an enterprise management tool such as system center component 136.

In one or more embodiments, there are a number of different models that can be utilized and each can be tightly related. Specifically, applications are built of models and code artifacts, and managed in the larger context of an enterprise management tool. The code-based tools, such as Visual Studio, support the creation, testing, and updating of code artifacts. The model-based tools, such as Quadrant, support the creation, testing, and updating of models. The model-based tools are aware of the relationships amongst models and the relationships between models and code artifacts, because those relationships are described in the models.

Fundamentally, the model-based tool provides a generic editing experience that allows one to see all models through views that make certain qualities of the models apparent (box-and-line, form, table, and so on). The user can customize this generic editing experience and store the customized view, and then recall it when dealing with similar data in the future. Developers can build new editors customized for particular models. These might provide custom editing experiences, or these might provide features specific to certain models (for instance, being able debug workflows in the workflow editor).

The repository 1504 contains both the schema for models and instances of models. Because model schemas are just models, and because the repository has a schema, various model-based tools can be used to generate new models as well as instances of existing models.

Example System

FIG. 17 illustrates an example computing device 1700 that can implement the various embodiments described above. Computing device 1700 can be, for example, any suitable computing device such as a client device and/or server device.

Computing device 1700 includes one or more processors or processing units 1702, one or more memory and/or storage components 1704, one or more input/output (I/O) devices 1706, and a bus 1708 that allows the various components and devices to communicate with one another. Bus 1708 represents one or more of any of several types of bus structures, including a memory bus or memory controller, a peripheral bus, an accelerated graphics port, and a processor or local bus using any of a variety of bus architectures. Bus 1708 can include wired and/or wireless buses.

Memory/storage component 1704 represents one or more computer storage media. Component 1704 can include volatile media (such as random access memory (RAM)) and/or nonvolatile media (such as read only memory (ROM), Flash memory, optical disks, magnetic disks, and so forth). Component 1704 can include fixed media (e.g., RAM, ROM, a fixed hard drive, etc.) as well as removable media (e.g., a Flash memory drive, a removable hard drive, an optical disk, and so forth).

One or more input/output devices 1706 allow a user to enter commands and information to computing device 1700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

Embodiments provide an architecture to enable composite, autonomous applications and services to be built and deployed. In addition, an infrastructure is provided to enable communication between and amongst distributed applications and services.

In one or more embodiments, an example architecture includes or otherwise leverages five logical modules including connectivity services, process services, identity services, lifecycle services and tools.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
  implementing a model-based composite application platform having a plurality of logical components to enable development, deployment, and management of composite applications, the composite applications being described by a model in terms of rules and declarative work flows that specify actions that occur in response to data changes and built by combining multiple independent constituent parts according to the model;
  providing, as a component of the model-based composite application platform, a connectivity service for allowing composite applications and services to communicate with one another, wherein the connectivity service supports response coordination to expected and unexpected states in one or more application modules, provides message brokering services, and virtualizes transfer, discovery and synchronization over multiple endpoints, and further wherein the connectivity service supports multiple different encoding standards, facilitates message-based, point-to-point communication, supports queries, ensures that applications are named consistently, and provides a security architecture for the composite applications, wherein the connectivity service implements wide-area proximity-aware routing and provides federated namespaces;
  providing, as a component of the model-based composite application platform, a process service to provide a runtime for composite applications, wherein the process service receives messages and, responsively, provides an environment that can be used to run a process for which a message has been sent, and processes messages and attempts to associate a message with a process that may be running;
  providing, as a component of the model-based composite application platform, an identity service that performs identity manipulations associated with composite applications, wherein the identity service includes an access layer and a directory stack accessible via the access layer, wherein the access layer comprises multiple different types of APIs for accessing data in the directory stack, and an access service for managing and using identities in connection with composite applications;
  providing, as a component of the model-based composite application platform, a lifecycle service that provides an environment in which a composite application can run, wherein the lifecycle service maintains information associated with a composite application, synchronizes data between multiple different data sources and composite applications, accesses a composite application and distributes the composite application on different machines, and analyzes performance of one or more composite applications.

2. The computer-implemented method of claim 1, wherein the model-based composite application platform is implemented to provide functionality for developers to develop the composite application via an application shell.

3. The computer-implemented method of claim 1, wherein the connectivity service further includes a service bus component configured to provide infrastructure for communications between the applications and the services.

4. The computer-implemented method of claim 1, wherein the service bus component is configured to utilize pluggable transports, encoders, and adapters to enable the communications between the applications and the services.

5. The computer-implemented method of claim 1, wherein the connectivity service further includes a federated naming component to ensure that the applications and resources are named consistently.

6. One or more computer-readable storage devices embodying instructions which, when executed, implement a method comprising:
  implementing a model-based composite application platform having a plurality of logical components to enable development, deployment, and management of composite applications, the composite applications being described by a model in terms of rules and declarative work flows that specify actions that occur in response to data changes and built by defining and deploying multiple independent constituent parts in a distributed manner according to the model;

providing, as a component of the model-based composite application platform, a connectivity service for allowing composite applications and services to communicate with one another, wherein the connectivity service supports response coordination to expected and unexpected states in one or more application modules, provides message brokering services, and virtualizes transfer, discovery and synchronization over multiple endpoints;

providing, as a component of the model-based composite application platform, a process service to provide a runtime for composite applications, wherein the process service receives messages and, responsively, provides an environment that can be used to run a process for which a message has been sent, and processes messages and attempts to associate a message with a process that may be running;

providing, as a component of the model-based composite application platform, an identity service that performs identity manipulations associated with composite applications, wherein the identity service includes an access layer and a directory stack accessible via the access layer, wherein the access layer comprises multiple different types of APIs for accessing data in the directory stack, and an access service for managing and using identities in connection with composite applications;

providing, as a component of the model-based composite application platform, a lifecycle service that provides an environment in which a composite application can run, wherein the lifecycle service maintains information associated with a composite application, synchronizes data between multiple different data sources and composite applications, accesses a composite application and distributes the composite application on different machines, and analyzes performance of one or more composite applications.

7. The one or more computer-readable storage devices of claim 6, wherein the connectivity service supports multiple different encoding standards, facilitates message-based, point-to-point communication, supports queries, ensures that applications are named consistently, and provides a security architecture for the composite applications.

8. The one or more computer-readable storage devices of claim 7, wherein the connectivity service implements wide-area proximity-aware routing and provides federated namespaces.

9. The one or more computer-readable storage devices of claim 6, wherein the connectivity service manages registrations for messages and events, receives messages that are intended for a message node and sends messages from a message node.

10. One or more computer-readable storage devices as described in claim 6, wherein the connectivity service includes a service bus component, a transaction services component, and a messaging services component.

11. One or more computer-readable storage devices as described in claim 6, wherein the lifecycle service is configured to provide a repository to which code modules for composite application are published and from which the composited application are accessed for execution.

12. A computing system comprising:
one or more processing devices;
one or more computer-readable storage media embodying instructions which, when executed via the one or more processing devices, implement a model-based composite application platform having a plurality of logical components to enable development, deployment, and management of composite applications, the composite applications being described by a model in terms of rules and declarative work flows and built by defining and deploying multiple independent constituent parts in a distributed manner according to the model through an interface that provides an application shell for development of the composite applications, the model-based composite application platform comprising:

a connectivity service for allowing composite applications and services to communicate with one another, wherein the connectivity service supports response coordination to expected and unexpected states in one or more application modules, provides message brokering services, and virtualizes transfer, discovery and synchronization over multiple endpoints;

a process service to provide a runtime for composite applications, wherein the process service receives messages and, responsively, provides an environment that can be used to run a process for which a message has been sent, and processes messages and attempts to associate a message with a process that may be running;

an identity service that performs identity manipulations associated with composite applications, wherein the identity service includes an access layer and a directory stack accessible via the access layer, wherein the access layer comprises multiple different types of APIs for accessing data in the directory stack, and an access service for managing and using identities in connection with composite applications;

a lifecycle service that provides an environment in which a composite application can run, wherein the lifecycle service maintains information associated with a composite application, synchronizes data between multiple different data sources and composite applications, accesses a composite application and distributes the composite application on different machines, and analyzes performance of one or more composite applications.

13. The computing system of claim 12, wherein the connectivity service supports multiple different encoding standards, facilitates message-based, point-to-point communication, supports queries, ensures that applications are named consistently, and provides a security architecture for the composite applications.

14. The computing system of claim 13, wherein the connectivity service implements wide-area proximity-aware routing and provides federated namespaces.

15. The computing system of claim 12, wherein the connectivity service manages registrations for messages and events, receives messages that are intended for a message node and sends messages from a message node.

16. The computing system of claim 12, wherein the connectivity service includes a service bus component, a transaction services component, and a messaging services component.

17. The computing system of claim 16, wherein the service bus component is configured to utilize one or more pluggable entities to virtualize message transfer independent of endpoint semantics, virtualize message representation independent of local data models, and bridge metadata and messages from a set of endpoints onto the service bus component.

18. The computing system of claim 16, wherein the service bus component further includes a federated naming component that ensures that resources are named consistently.

19. The computing system of claim 16, wherein the transaction services component is configured to identify resource managers involved in a transaction and coordinate the transaction using the resource managers.

20. The computing system of claim 16, wherein the messaging services component implements: common messaging patterns including queuing and publication/subscription; content-based routing; and event correlation.

* * * * *